United States Patent
Trikalinou et al.

(10) Patent No.: US 12,210,660 B2
(45) Date of Patent: Jan. 28, 2025

(54) CRYPTOGRAPHIC COMPUTING WITH LEGACY PERIPHERAL DEVICES

(71) Applicant: Intel Corporation, Santa Clara, CA (US)

(72) Inventors: Anna Trikalinou, Hillsboro, OR (US); Abhishek Basak, Bothell, WA (US); Rupin H. Vakharwala, Hillsboro, OR (US); Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 17/548,170

(22) Filed: Dec. 10, 2021

(65) Prior Publication Data

US 2022/0100911 A1    Mar. 31, 2022

(51) Int. Cl.
*G06F 21/83* (2013.01)
*G06F 21/62* (2013.01)
*G06F 21/78* (2013.01)

(52) U.S. Cl.
CPC .......... *G06F 21/83* (2013.01); *G06F 21/6209* (2013.01); *G06F 21/78* (2013.01)

(58) Field of Classification Search
CPC .............. G06F 12/1081; G06F 12/109; G06F 12/1408; G06F 12/1441; G06F 12/145; G06F 12/1475; G06F 12/1483; G06F 12/1491; G06F 21/606; G06F 21/6209; G06F 21/78; G06F 21/83; G06F 2212/1016; G06F 2212/1044; G06F 2212/1052; G06F 2212/657; H04L 63/0428; H04L 9/0861
See application file for complete search history.

(56) References Cited

U.S. PATENT DOCUMENTS

| | | | |
|---|---|---|---|
| 2017/0371808 A1* | 12/2017 | Shaw | G06F 12/1466 |
| 2020/0125501 A1 | 4/2020 | Durham et al. | |
| 2020/0210070 A1* | 7/2020 | Durham | G06F 3/0679 |
| 2021/0117340 A1* | 4/2021 | Trikalinou | H04L 9/0637 |
| 2021/0117342 A1 | 4/2021 | Durham | |
| 2021/0150040 A1 | 5/2021 | Durham et al. | |
| 2022/0100911 A1* | 3/2022 | Trikalinou | G06F 21/606 |
| 2022/0206958 A1* | 6/2022 | LeMay | G06F 12/0831 |
| 2023/0384934 A1* | 11/2023 | Reddy | G06F 3/0679 |

FOREIGN PATENT DOCUMENTS

WO     2022139850 A1     6/2022

OTHER PUBLICATIONS

EPO Extended European Search Report in EP Application Serial No. 22205070.0-1218 mailed on May 9, 2023 (9 pages).

\* cited by examiner

*Primary Examiner* — Theodore C Parsons
(74) *Attorney, Agent, or Firm* — Alliance IP, LLC

(57) ABSTRACT

In one embodiment, a read request is received from a peripheral device across an interconnect, with the read request including a process identifier and an encrypted virtual address. One or more keys are obtained based on the process identifier of the read request, and the encrypted virtual address of the read request is decrypted based on the one or more keys to obtain an unencrypted virtual address. Encrypted data is retrieved from memory based on the unencrypted virtual address, and the encrypted data is decrypted based on the one or more keys to obtain plaintext data. The plaintext data is transmitted to the peripheral device across the interconnect.

25 Claims, 16 Drawing Sheets

CRYPTOGRAPHIC COMPUTING WITH LEGACY PERIPHERAL DEVICES

FIELD

This disclosure relates in general to the field of computer systems, and more particularly, to cryptographic computing.

BACKGROUND

Cryptographic computing may refer to computer system security solutions that employ cryptographic mechanisms inside of processor components to protect data stored by a computing system. The cryptographic mechanisms may be used to encrypt the data itself and/or pointers to the data using keys, tweaks, or other security mechanisms. Cryptographic computing is an important trend in the computing industry, with the very foundation of computing itself becoming fundamentally cryptographic. Cryptographic computing represents a sea change, a fundamental rethinking of systems security with wide implications for the industry.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts.

DETAILED DESCRIPTION

Figure 1:
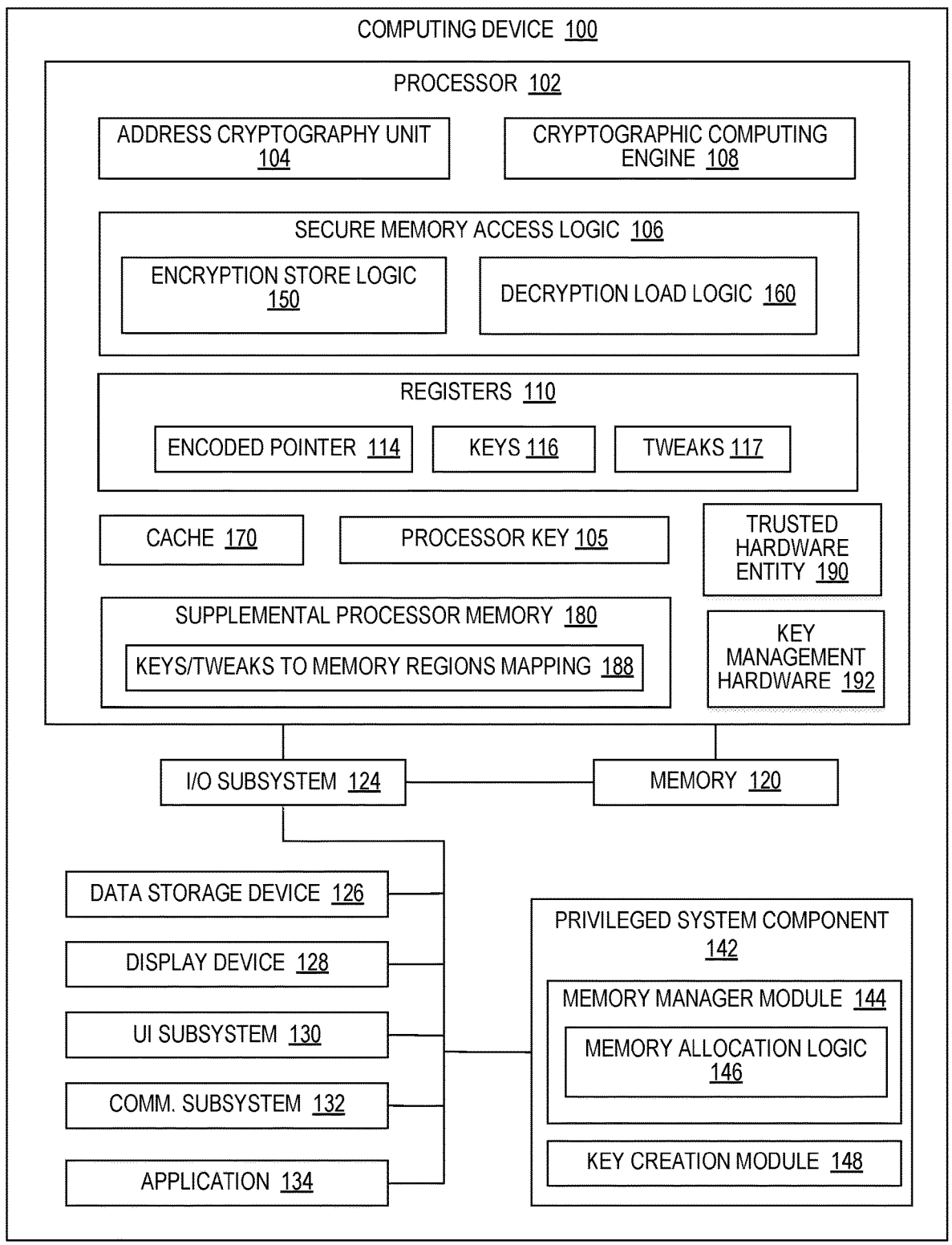
FIG. 1 is a simplified block diagram of an example computing device configured with secure memory access logic according to at least one embodiment of the present disclosure.

This disclosure provides various possible embodiments, or examples, for implementations of memory write instructions that may be used in the context of cryptographic computing. Generally, cryptographic computing may refer to computer system security solutions that employ cryptographic mechanisms inside processor components as part of its computation. Some cryptographic computing systems may implement the encryption and decryption of pointer addresses (or portions thereof), keys, data, and code in a processor core using encrypted memory access instructions. Thus, the microarchitecture pipeline of the processor core may be configured in such a way to support such encryption and decryption operations.

Embodiments disclosed in this application are related to proactively blocking out-of-bound accesses to memory while enforcing cryptographic isolation of memory regions within the memory. Cryptographic isolation may refer to isolation resulting from different regions or areas of memory being encrypted with one or more different parameters. Parameters can include keys and/or tweaks. Isolated memory regions can be composed of objects including data structures and/or code of a software entity (e.g., virtual machines (VMs), applications, functions, threads). Thus, isolation can be supported at arbitrary levels of granularity such as, for example, isolation between virtual machines, isolation between applications, isolation between functions, isolation between threads, or isolation between data structures (e.g., few byte structures).

Encryption and decryption operations of data or code associated with a particular memory region may be performed by a cryptographic algorithm using a key associated with that memory region. In at least some embodiments, the cryptographic algorithm may also (or alternatively) use a tweak as input. Generally, parameters such as 'keys' and 'tweaks' are intended to denote input values, which may be secret and/or unique, and which are used by an encryption or decryption process to produce an encrypted output value or decrypted output value, respectively. A key may be a unique value, at least among the memory regions or subregions being cryptographically isolated. Keys may be maintained, e.g., in either processor registers or processor memory (e.g., processor cache, content addressable memory (CAM), etc.) that is accessible through instruction set extensions. A tweak can be derived from an encoded pointer (e.g., security context information embedded therein) to the memory address where data or code being encrypted/decrypted is stored or is to be stored and, in at least some scenarios, can also include security context information associated with the memory region.

At least some embodiments disclosed in this specification, including read and write operations, are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the address in the pointer includes a plurality of bits and is encrypted (and decrypted) based on a secret address key and a tweak based on the metadata. Other pointers can be encoded with a plaintext memory address (e.g., linear address) and metadata.

For purposes of illustrating the several embodiments for proactively blocking out-of-bound memory accesses while enforcing cryptographic isolation of memory regions, it is important to first understand the operations and activities associated with data protection and memory safety. Accordingly, the following foundational information may be viewed as a basis from which the present disclosure may be properly explained.

Known computing techniques (e.g., page tables for process/kernel separation, virtual machine managers, managed runtimes, etc.) have used architecture and metadata to provide data protection and isolation. For example, in previous solutions, memory controllers outside the CPU boundary support memory encryption and decryption at a coarser granularity (e.g., applications), and isolation of the encrypted data is realized via access control. Typically, a cryptographic engine is placed in a memory controller, which is outside a CPU core. In order to be encrypted, data travels from the core to the memory controller with some identification of which keys should be used for the encryption. This identification is communicated via bits in the physical address. Thus, any deviation to provide additional keys or tweaks could result in increased expense (e.g., for new buses) or additional bits being "stolen" from the address bus to allow additional indexes or identifications for keys or tweaks to be carried with the physical address. Access control can require the use of metadata and a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic isolation of memory compartments (also referred to herein as 'memory regions'), resolves many of the aforementioned issues (and more). Cryptographic isolation may make redundant the legacy modes of process separation, user space, and kernel with a fundamentally new fine-grain protection model. With cryptographic isolation of memory compartments, protections are cryptographic, with various types of processor units (e.g., processors and accelerators) alike utilizing secret keys (and optionally tweaks) and ciphers to provide access control and separation at increasingly finer granularities. Indeed, isolation can be supported for memory compartments as small as a one-byte object to as large as data and code for an entire virtual machine. In at least some scenarios, cryptographic isolation may result in individual applications or functions becoming the boundary, allowing each address space to contain multiple distinct applications or functions. Objects can be selectively shared across isolation boundaries via pointers. These pointers can be cryptographically encoded or non-cryptographically encoded. Furthermore, in one or more embodiments, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported.

Cryptographic isolation leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata (e.g., context information). When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Although the cryptographically encoded pointer (or non-cryptographically encoded pointers) can be used to isolate data, via encryption, the integrity of the data may still be vulnerable. For example, unauthorized access of cryptographically isolated data can corrupt the memory region where the data is stored regardless of whether the data is encrypted, corrupting the data contents unbeknownst to the victim. Data integrity may be supported using an integrity verification (or checking) mechanism such as message authentication codes (MACS) or implicitly based on an entropy measure of the decrypted data, or both. In one example, MAC codes may be stored per cacheline and evaluated each time the cacheline is read to determine whether the data has been corrupted. Such mechanisms, however, do not proactively detect unauthorized memory accesses. Instead, corruption of memory (e.g., out-of-bounds access) may be detected in a reactive manner (e.g., after the data is written) rather than a proactive manner (e.g., before the data is written). For example, memory corruption may occur by a write operation performed at a memory location that is out-of-bounds for the software entity. With cryptographic computing, the write operation may use a key and/or a tweak that is invalid for the memory location. When a subsequent read operation is performed at that memory location, the read operation may use a different key on the corrupted memory and detect the corruption. For example, if the read operation uses the valid key and/or tweak), then the retrieved data will not decrypt properly and the corruption can be detected using a message authentication code, for example, or by detecting a high level of entropy (randomness) in the decrypted data (implicit integrity).

FIG. 1 is a simplified block diagram of an example computing device 100 for implementing a proactive blocking technique for out-of-bound accesses to memory while enforcing cryptographic isolation of memory regions using secure memory access logic according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address.

Processor 102 also includes registers 110, which may include e.g., general purpose registers and special purpose registers (e.g., control registers, model-specific registers (MSRs), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some embodiments, tweaks 117 used for encryption and decryption of addresses, code, and/or data may be stored in registers 110.

A processor key 105 (also referred to herein as a 'hardware key') may be used for various encryption, decryption, and/or hashing operations and may be configured as a secure key in hardware of the processor 102. Processor key 105 may, for example, be stored in fuses, stored in read-only memory, or generated by a physically unclonable function that produces a consistent set of randomized bits. Generally, processor key 105 may be configured in hardware and known to processor 102, but not known or otherwise available to privileged software (e.g., operating system, virtual machine manager (VMM), firmware, system software, etc.) or unprivileged software.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc. For example, in one embodiment, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 are embodied as part of new load (read) and store (write) processor instructions that perform respective decryption and encryption operations to isolate memory compartments. Decryption load logic 160 and encryption store logic 150 verify encoded metadata on memory read and write operations that utilize the new processor instructions (e.g., which may be counterparts to existing processor instructions such as MOV, where a general purpose register is used as a memory address to read a value from memory (e.g., load) or to write a value to memory (e.g., store).

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114. The cryptographic computing engine 108 can include logic (including circuitry) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 ?m2 of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, e.g., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic isolation such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer, returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

The encoded pointer 114 is returned to its original (e.g., canonical) form, based on appropriate operations in order to restore the original value of the encoded pointer 114 (e.g., the true, original linear memory address). To do this in at least one possible embodiment, the address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

In one or more embodiments, a hardware trusted entity 190 and key management hardware 192 for protecting keys in cryptographic computing may be configured in computing device 100. Hardware trusted entity 190 and key management hardware 192 may be logically separate entities or combined as one logical and physical entity. This entity is configured to provide code and data keys in the form of an encrypted key from which a code, data, or pointer key can be decrypted or a unique key identifier from which a code, data, or pointer key can be derived. Hardware trusted entity 190 and key management hardware 192 may be embodied as circuitry, firmware, software, or any suitable combination thereof. In at least some embodiments, hardware trusted entity and/or key management hardware 190 may form part of processor 102. In at least some embodiments, hardware trusted entity and/or key management hardware 190 may be embodied as a trusted firmware component executing in a privileged state. Examples of a hardware trusted entity can include, but are not necessarily limited to Secure-Arbitration Mode (SEAM) of Intel® Trust Doman Extensions, etc., Intel® Converged Security Management Engine (CSME), an embedded security processor, other trusted firmware, etc.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 120 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
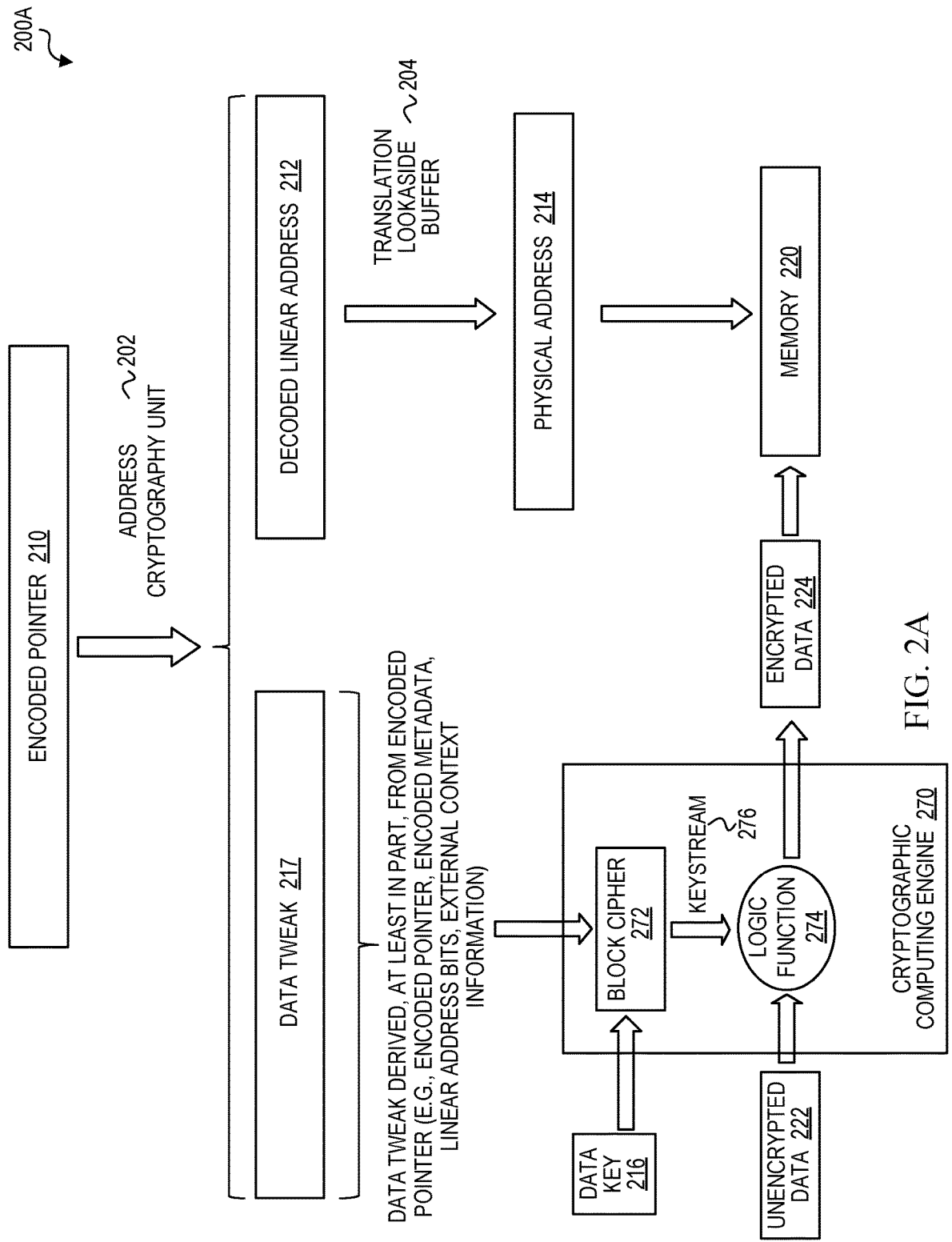
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, pointer 210 is an example of encoded pointer 114 and is embodied as an encoded linear address including a metadata portion. The metadata portion is some type of context information (e.g., size/power metadata, tag, version, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, or a version number.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 decodes the encoded pointer 210 to obtain a decoded linear address 212. The decoded linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer, one or more portions of the encoded pointer, a portion of the decoded linear address, the entire decoded linear address, encoded metadata, and/or external context information (e.g., context information that is not encoded in the pointer).

Once the tweak 217 has been derived from encoded pointer 210, a cryptographic computing engine 270 can compute encrypted data 224 by encrypting unencrypted data 222 based on a data key 216 and the data tweak 217. In at least one embodiment, the cryptographic computing engine 270 includes an encryption algorithm such as a keystream generator, which may be embodied as an AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
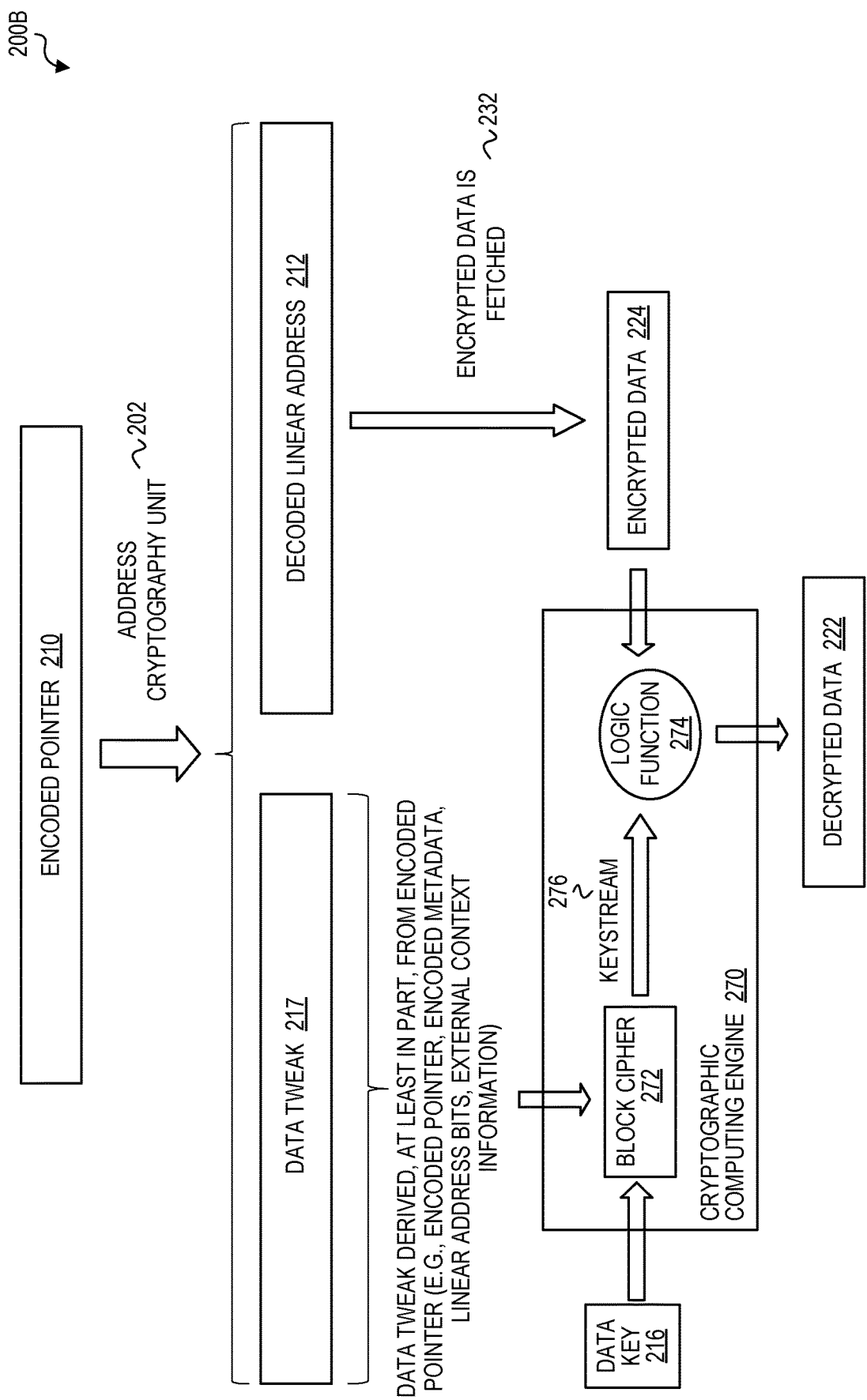
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210. First, address cryptography unit 202 decodes the encoded pointer 210 to obtain the decoded linear address 212, which is used to fetch the encrypted data 224 from memory, as indicated at 232. Data tweak 217 is derived, at least in part, from the encoded pointer 210. In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

Cryptographic Computing with Legacy, Non-SVM (Shared Virtual Memory) Devices

Embodiments herein may provide one or more of the benefits of cryptographic computing to input/output (IO) devices. For instance, certain embodiments may implement an architecture that can enforce memory safety, including protection against buffer overflows, use-after-free, etc., in heterogeneous workloads and across different compute elements (e.g., between a CPU and GPU). The architecture may be implemented by legacy, non-CC enlightened devices.

In particular embodiments, a new Cryptographic Computing IO (CCIO) agent is implemented in a host system (e.g., in an uncore of a processor or system-on-chip (SoC)). The CCIO agent may uniquely encrypt pointers and associated data with a per-object granularity. For instance, in certain embodiments, data may be encrypted based on a key that is associated with a particular Process Address Space Identifier (PASID), and the encryption may be tweaked with the encrypted pointer associated with the data. Some embodiments may also define certain storage techniques for the per-process data and pointer keys, as described further below. These techniques may be referred to generally herein as CCIO.

Embodiments that implement CCIO as described herein may provide one or more advantages over current protection techniques. In particular, CCIO may defend against 2 main classes of attacks: (1) attacks within a device, and (2) attacks across devices.

Attacks within a device may include privilege escalation attacks (i.e. sandbox/container escape), where an attacker exploits a memory vulnerability within the workload to corrupt or disclose privilege information or gain control of the execution, and cross-process attacks, in which an attacker exploits a memory vulnerability within the workload to corrupt or disclose information or gain control of a different device workload running on the same device. In general, the device security architecture and its driver are responsible for maintaining per process isolation within the device boundaries. This is usually implemented by maintaining isolation between the device interfaces (if device support multitenancy), maintaining memory separation for the in-device memory, etc. Some examples of these types of attacks include the Mind Control Attack (which exploited a buffer overflow in CUDA to change prediction of a machine learning algorithm), Dynamic Buffer Overflow Detection for GPGPUs (which found 13 buffer overflows in 7 benchmark suites), and Buffer overflow vulnerabilities in CUDA.

For attacks across devices, the main security threats may come from a device workload attacking the CPU workload to do a sandbox/container escape. This attack may greatly depend on the device usage. For example, when a device supports Shared Virtual Memory (SVM), where both memory pages and page tables are shared between the device and the CPU, a device workload can access the entire CPU process address space. In this case, a malicious device workload can corrupt memory that was intended for only CPU to use (e.g., a return address) and cause the attacker to gain control of CPU execution. With SVM enabled, there is currently no way to separate memory or annotate memory to be used by CPU vs. a device. With Shared Virtual Memory not supported (or not enabled), memory separation between device workload and CPU workload is done on a page granularity. The CPU process acts as the primary resource manager and marks explicitly the pages that are going to be accessed by the device process. In this case, buggy software may give access to the device to resources that are not meant to be shared.

CCIO embodiments described herein can provide memory confidentiality with a per-object granularity and can protect against all of the aforementioned attacks.

Figure 3:
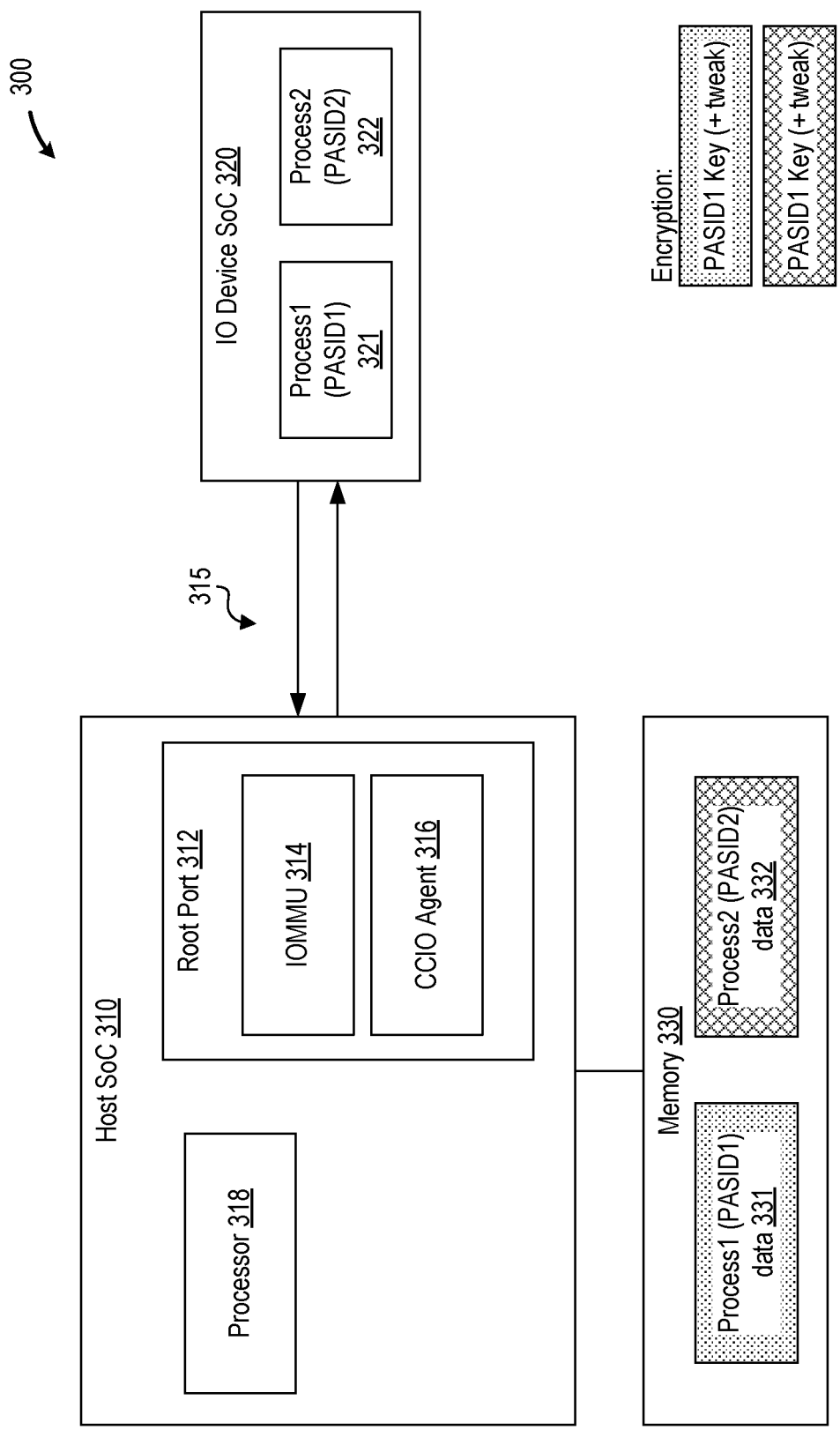
FIG. 3 illustrates a simplified block diagram of an example system for providing cryptographic computing for IO devices in accordance with certain embodiments

FIG. 3 illustrates a simplified block diagram of an example system 300 for providing cryptographic computing for IO devices in accordance with certain embodiments. In the example system 300, a host SoC 310 is coupled to an IO Device SoC 320 over an interconnect, such as a PCIe-, CXL-, or USB-based interconnect 315. The host SoC 310 includes a processor 318 and is coupled to memory 330, which may store data associated with execution of instructions by the processor 318 and/or data associated with the IO device SoC 320. Each of SoCs 301, 320 may include additional, fewer, or other components than those shown, or may include the same components configured in a different manner than shown. The host SoC 310 includes a root port 312, which interconnects the IO device SoC 320 with the processor 318 of the host SoC 310 and with the memory 330 connected to the host SoC 310. In some instances, the root port 312 may function similar to a PCIe root complex (e.g., controller hub 715 of FIG. 7). The root port 312 includes an IOMMU 314, which may include a memory management unit (MMU) that connects a direct memory access (DMA)-capable I/O bus to the memory 330 coupled to the host SoC 310. The root port 312 also includes a CCIO agent 316, which may perform one or more encryption/decryption functions as described herein (e.g., operations described with respect to FIGS. 4, 5).

As shown in FIG. 3, the IO device may run two (or more) different processes 321, 322, which are each associated with a unique PASID. Data associated with each process (331, 332, respectively) may be encrypted based on a unique, per-process (e.g., per-PASID) key. The encryption may be tweaked by a pointer associated with the location of the data in the memory 330. In some instances, the pointer may be encoded or encrypted, as described above. For instance, in some embodiments, the pointer may be encrypted based on the per-process (e.g., per-PASID) key with which the data is encrypted. In other embodiments, there may be a first key that is used for the data encryption (a data key or CC data key) and second key that is used for the pointer encryption (a pointer key or CC pointer key). Where there are separate data and pointer encryption keys, the keys may be of the same size (e.g., 128 bits), or may be of different sizes (e.g., 128 bits for pointer encryption and 96 bits for data encryption).

Figure 4:
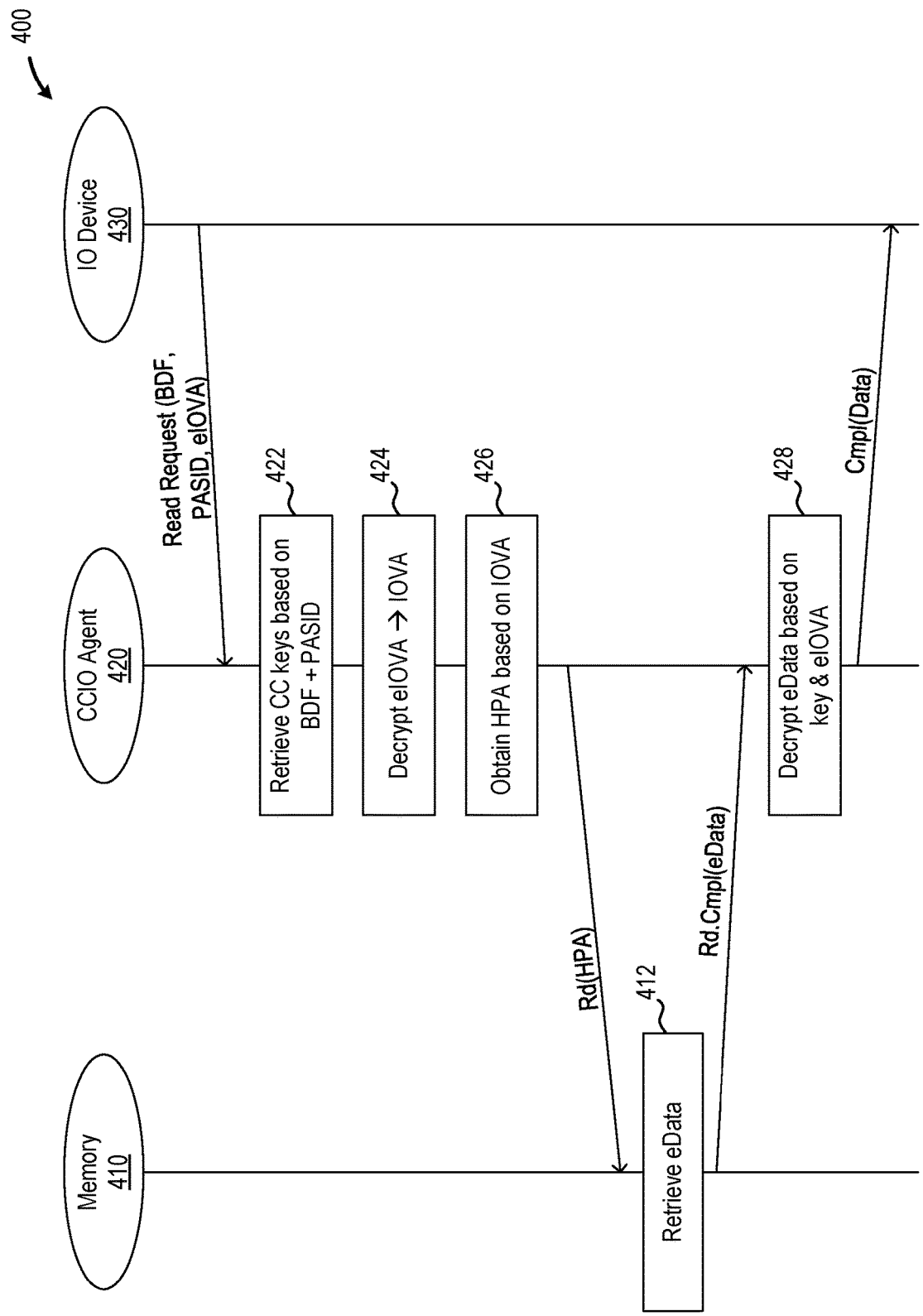
FIG. 4 illustrates an example flow diagram of a read process in accordance with embodiments of the present disclosure.

FIG. 4 illustrates an example flow diagram 400 of a read process in accordance with embodiments of the present disclosure. In the example shown, a PCIe-based interconnect is assumed; however, it will be understood that the concepts shown in FIG. 4 may be applied to CXL-based interconnects, USB-based interconnects, or other types of IO protocols. In addition, it will be understood that fewer, additional, or other operations other than those shown in the flow 400 may be included or implemented in CCIO embodiments.

In the example flow 400, the IO device 430 first sends a read request that includes a PASID, Bus/Device/Function (BDF), and virtual address. The read request be a PCIe Untranslated Request for an encrypted IO virtual address (IOVA) or encrypted nested IOVA (eIOVA), depending on whether the IOMMU is configured to do first level or nested translation for transactions that are coming from the device's BDF. Note that prior to the device doing DMA, the application has already allocated and pinned the memory pages in DRAM that will then be accessed by the IO device 430. During allocation, the modified glibc library may encrypt the data and the associated pointers. The application can use the encrypted pointers in the device workload and submit the workload to the device, e.g., via memory mapped IO (MMIO).

When the CCIO agent 420 in the host device receives the Untranslated Request, the host retrieves the CC key(s) that are associated with this BDF+PASID at 422. This may include a single key that is used for data and pointer encryption, or separate data and pointer encryption keys (the following description assumes there are separate keys). The CCIO agent then decrypts the eIOVA using the CC pointer key to yield the IOVA at 424. The CCIO agent 420 then does necessary translations at 426 to obtain the host Physical Address (HPA) for the obtained IOVA. The CCIO agent 420 then initiates a read transaction to the memory 410, which retrieves the encrypted data stored therein at 412, and returns the encrypted data (eData) to the CCIO agent 420 with a read completion indication.

The CCIO agent 420 then decrypts the received encrypted data at 428 using the eIOVA and the CC data key and sends the plaintext data (Data) to the IO device 430 with a read completion indication (e.g., read completion TLP). The IO device 430 can then consume, modify, etc. the plaintext data as it normally would.

Figure 5:
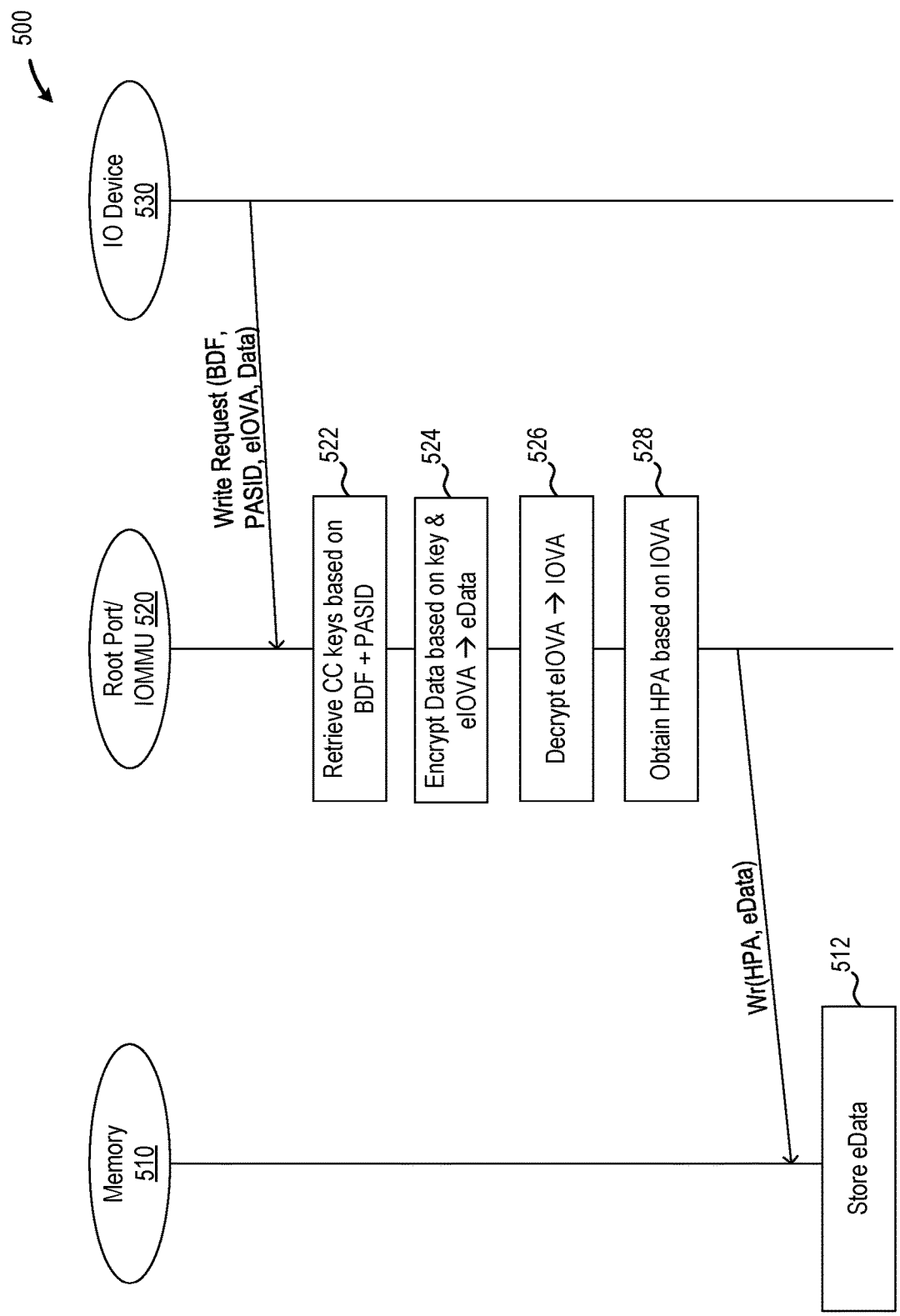
FIG. 5 illustrates an example flow diagram of a write process in accordance with embodiments of the present disclosure.

FIG. 5 illustrates an example flow diagram 500 of a write process in accordance with embodiments of the present disclosure. In the example shown, a PCIe-based interconnect is assumed; however, it will be understood that the concepts shown in FIG. 5 may be applied to CXL-based interconnects, USB-based interconnects, or other types of IO protocols. In addition, it will be understood that fewer, additional, or other operations other than those shown in the flow 500 may be included or implemented in CCIO embodiments.

In the example flow 500, the IO device 530 first sends a write request that includes plaintext data (Data), a PASID, Bus/Device/Function (BDF), and encrypted virtual address (IOVA). The write request may be an Untranslated Request for an encrypted IO virtual address (IOVA) or encrypted nested IOVA (eIOVA), depending on whether the IOMMU is configured to do first level or nested translation for transactions that are coming from the device's BDF.

When the CCIO agent 520 in the host device receives the Untranslated Request, the CCIO agent retrieves the CC key(s) that are associated with this BDF+PASID at 522, encrypts the plaintext data using the retrieved CC data key (with the eIOVA being used as a tweak) at 524 (yielding eData), decrypts the eIOVA using the CC pointer key to yield the IOVA at 526, and does necessary translations at 528 to obtain the host Physical Address (HPA) for the obtained IOVA. The CCIO agent then initiates a write transaction to the memory 510 with the HPA and eData, and the memory 510 stores the encrypted data at 512.

In the examples above, the CCIO agent (e.g., 316, 420, or 520) may be implemented in any suitable location within the host device. For example, the CCIO agent may be implemented within the IOMMU (e.g., 314), which may be extended to perform the CCIO operations (e.g., the encryption/decryption, etc. described above). This may be convenient for embodiments in which the CC keys are stored in a VTd PASID table entry (see further discussion below) or for embodiments in which the CC keys are stored in memory (see further discussion below). In other embodiments, the CCIO agent may be implemented as a dedicated component. For example, the CCIO agent may be implemented as a separate logic component within a root port of a host device (e.g., as shown in FIG. 3) or as a dedicated intellectual property (IP) logic chip in the host device (e.g., outside of the root port 312 in FIG. 3). This implementation may be convenient for embodiments in which the CC keys are stored in a dedicated memory located within the CCIO agent (see further discussion below). In implementations where the architecture does not store IOVAs in the Outbound Completion (OTC) buffer, it may be expensive to add the eIOVA for every OTC entry, since this would affect all DMA traffic for both CC and non-CC scenarios. Accordingly, a new Outbound Completion buffer may be implemented in the CCIO Agent for only CCIO-based outbound transactions. The CCIO OTC can be pre-allocated for CCIO-only outbound transactions and when the transaction completes, the CCIO Agent can proceed with decrypting the eData.

Further, in the examples described above, the CC keys (the CC data keys and CC pointer keys) may be stored in any suitable location in the host device. As one example, the CC keys may be stored within PASID table entries. In this approach, the CC keys may be cached within a PASID cache, which can accelerate a page walk. The PASID cache may be implemented to accelerate page walks, wherein PASID table entries are cached. Thus, if the PASID table entry is extended, so too can the corresponding PASID cache.

As another example, the CC keys may be stored within a dedicated a dedicated memory (e.g., static random-access memory (SRAM)). In such embodiments, a portion of the PASID space (e.g., 128 PASIDs), may be carved out and software can use these PASIDs for CCIO. For those PASIDs, we can have a dedicated SRAM (e.g., within the CCIO agent) to store the associated CC keys. In this case, hardware would support up to the allocated number (e.g., 128) of PASIDs per IOMMU using CCIO concurrently. Table 1 below shows example values for MMIO space needed for different combinations of reserved PASIDs and CCIO entry sizes.

TABLE 1

| CCIO Entry Size (bits) | CCIO PASIDs | MMIO Space Needed |
|---|---|---|
| 256 | 128 | 4 KB |
| 512 | 128 | 8 KB |
| 256 | 256 | 8 KB |
| 512 | 256 | 16 KB |

Depending on whether the IOMMU is responsible for CC IO operations or a dedicated agent is responsible, the host would detect that CCIO is used for a particular BDF+PASID combination from the PASID Table Entry (using, e.g., a new CC Enable bit). If CC is enabled for that PASID, then the host would lookup the SRAM using the lowest PASID bits (e.g., the lowest 8 or 9 bits) to retrieve the CC keys and do address decryption. Data encryption/decryption may be done in a similar way.

As yet another example, the CC keys may be stored in memory (e.g., dynamic random access memory (DRAM), such as memory 330 of FIG. 3), which may provide a scalable implementation. In some instances, a new hierarchical structure may be implemented within memory and the host can perform another layer of page walking to retrieve the keys.

Figure 6:
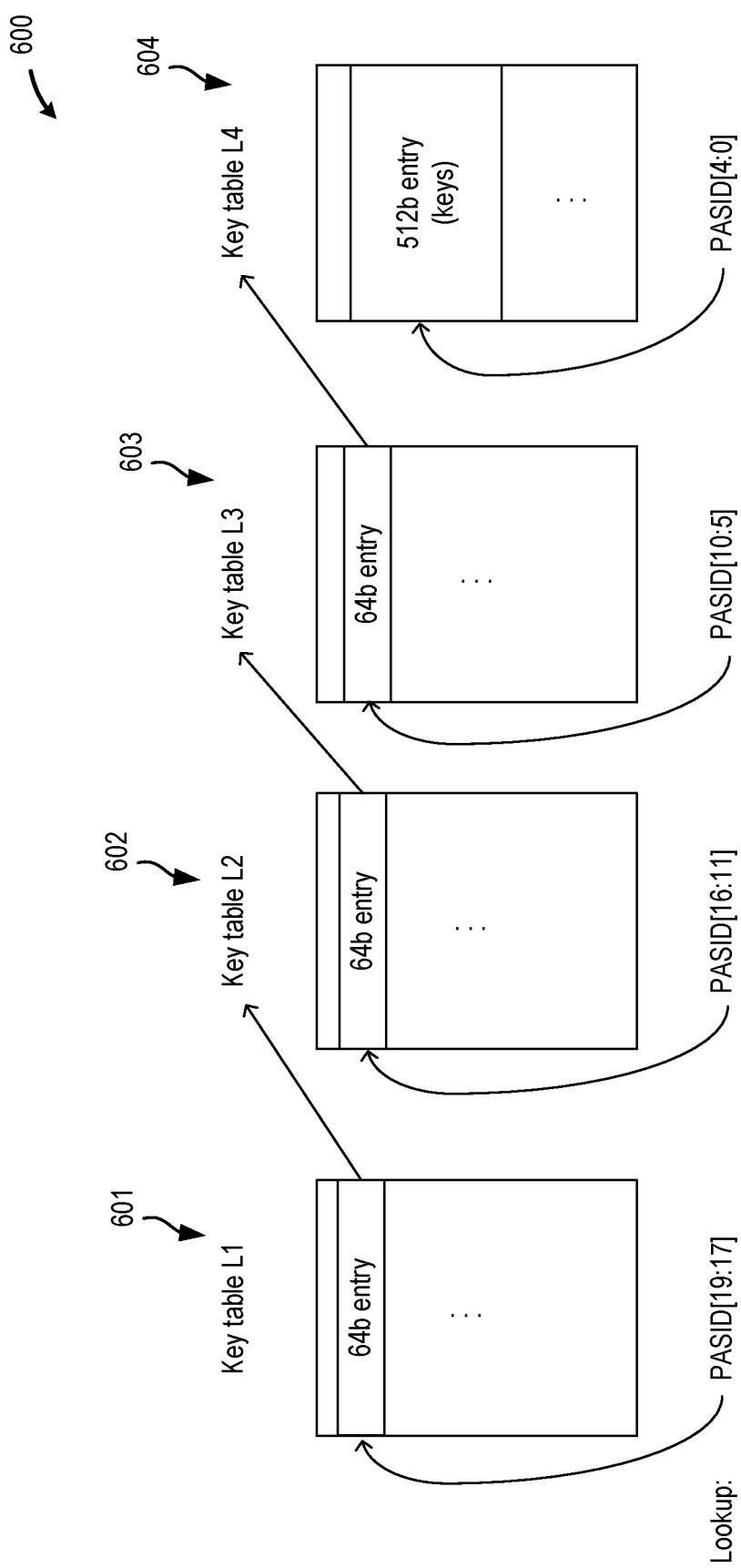
FIG. 6 illustrates an example hierarchical structure that may be used to store CC keys in accordance with embodiments of the present disclosure.

FIG. 6 illustrates an example hierarchical structure 600 that may be used to store CC keys in accordance with embodiments of the present disclosure. The example structure 600 includes 4 levels of cryptographic computing key tables (CCKTs), with the final level (L4 in the example shown) containing the CC key(s). The tables are looked up based on bits of the PASID. For instance, in the example shown, a first, level 1 (L1) table 601 includes a number of entries that include pointers to one of multiple level 2 (L2) tables. The PASID bits 17-19 (the most significant bits) may be used to locate the particular entry within the L1 table 601 that points to a particular L2 table 602. The next PASID bits 16-11 may then be used to locate the particular entry within the L2 table 602 that points to a particular L3 table 603 of multiple L3 tables. The next PASID bits 10-5 may then be used to locate the particular entry within the L3 table 603 that points to a particular L4 table 604 of multiple L4 tables. Finally, the PASID bits 4-0 (the least significant bits) may be used to locate the entry within the L4 table 604 that includes the CC keys associated with the PASID. This approach may be quite scalable, as it allows hardware to support CCIO for all IO processes (which can be up to 2^20 (~1 million) processes). Another benefit is that the CCK Table lookup can be parallelized with a regular PASID page walk. In some embodiments, dedicated caches can be defined to accelerate the walk.

As yet another example, CC keys may be stored in DRAM memory, but the PASID table may be extended to include a pointer that points to the CC keys stored in memory. For instance, upper unused bits of a PASID table entry (e.g., PASID[255:199]) can be used to store a pointer to a 256-bit CCIO Key Structure, which can include a pointer key, data key, etc. Host software may manage the CC Key Structures and may place multiple CCIO Key Structures in the same page (e.g., up to 128 CCIO Key Structures).

Figure 7:
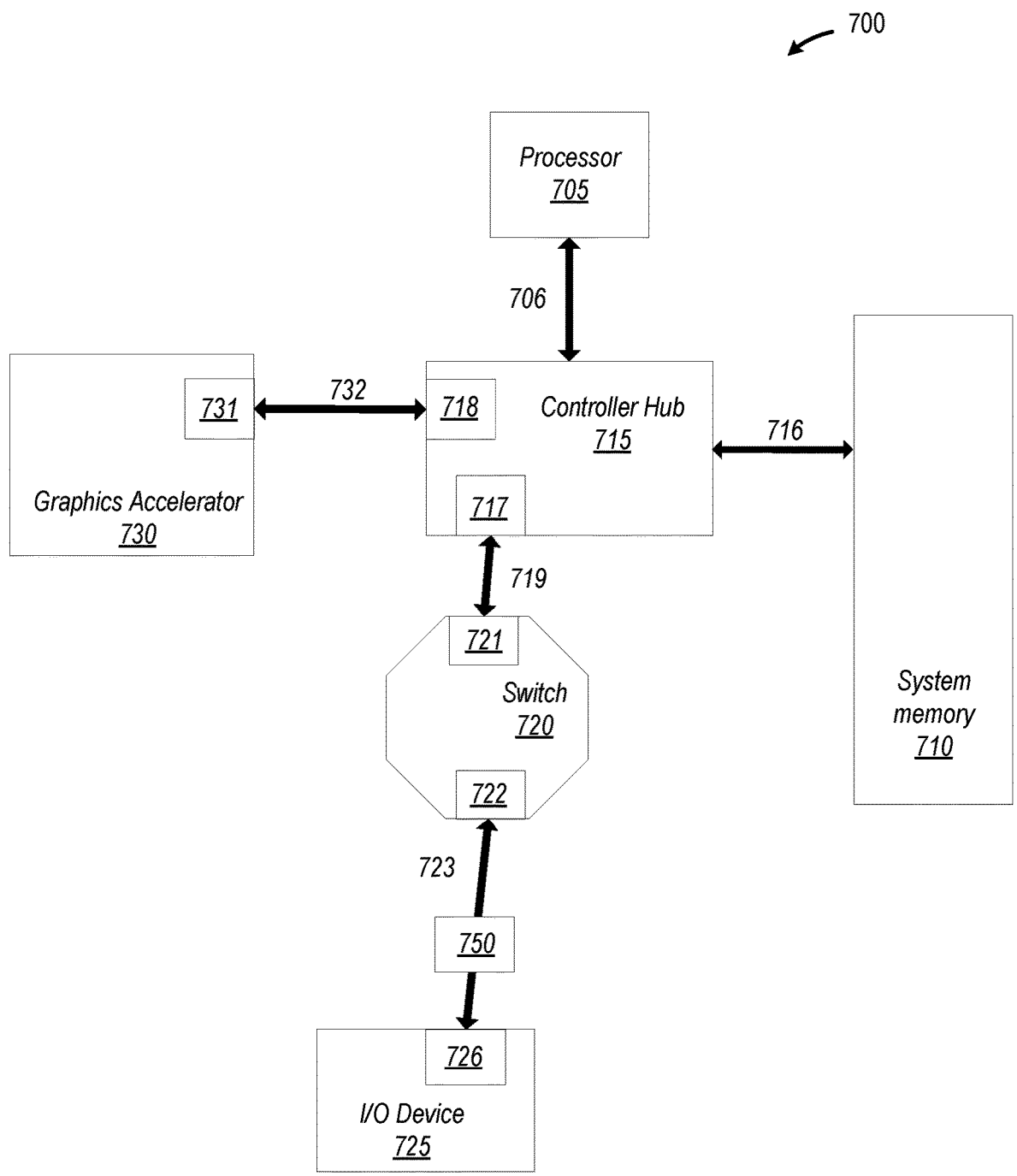
FIG. 7 illustrates an embodiment of a computing system including an interconnect architecture.

FIGS. 7-10 illustrate example interconnect embodiments in which aspects of the present disclosure may be incorporated. Referring to FIG. 7, an embodiment of a fabric composed of point-to-point Links that interconnect a set of components is illustrated. System 700 includes processor 705 and system memory 710 coupled to controller hub 715.

Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard. In some implementations, the system may include logic to implement multiple protocol stacks and further logic to negotiation alternate protocols to be run on top of a common physical layer, among other example features.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705. Further, one or more links (e.g., 723) of the system can include one or more extension devices (e.g., 750), such as retimers, repeaters, etc.

Figure 8:
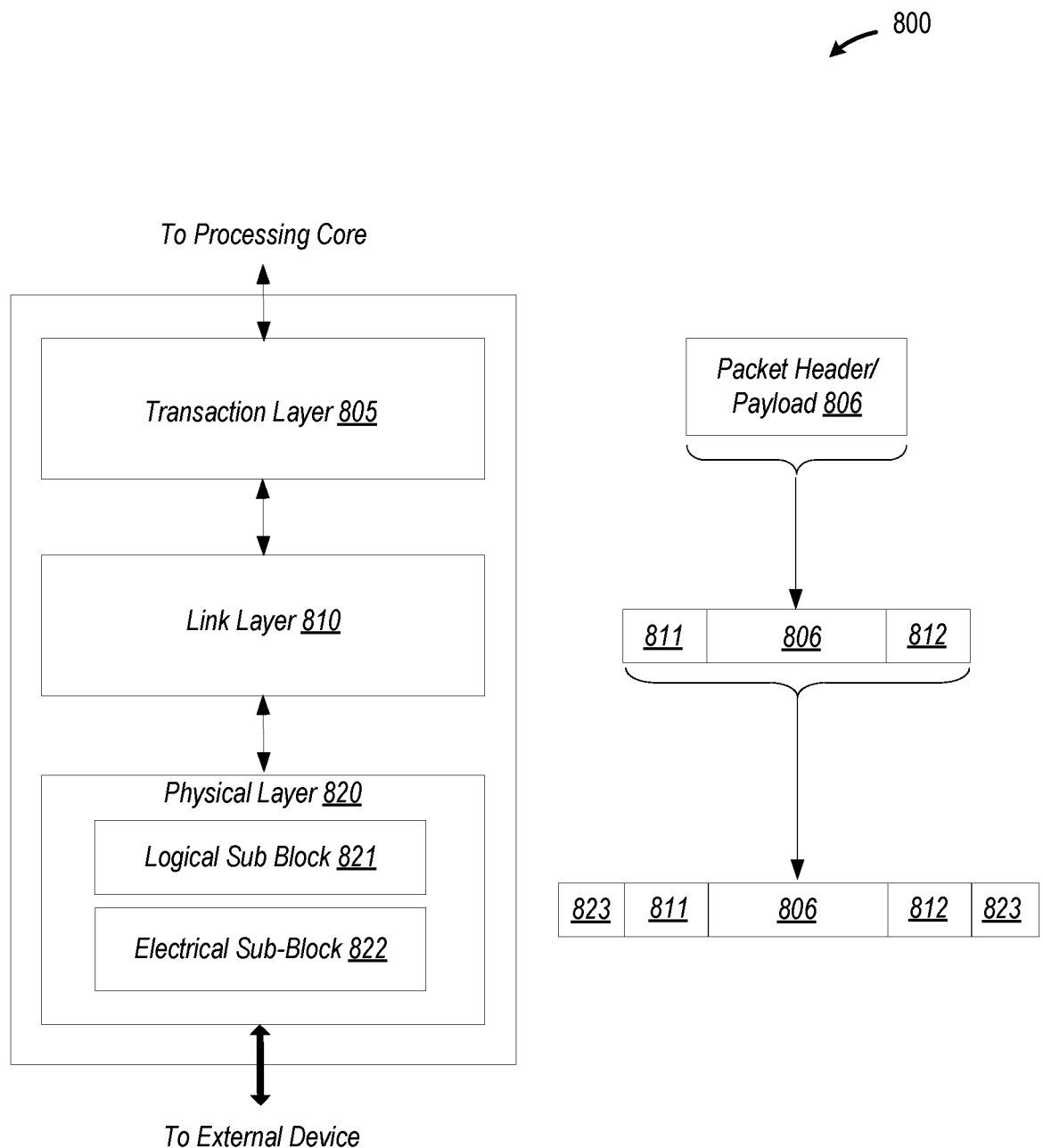
FIG. 8 illustrates an embodiment of an interconnect architecture including a layered stack.

Turning to FIG. 8 an embodiment of a layered protocol stack is illustrated. Layered protocol stack 800 includes any form of a layered communication stack, such as a Quick Path Interconnect (QPI) stack, a PCIe stack, a next generation high performance computing interconnect stack, or other layered stack. Although the discussion below relates to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8$b$/10$b$ transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

A variety of other interconnect architectures and protocols may utilize the concepts discussed herein. In one example, Compute Express Link (CXL) may be used. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples).

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 9:
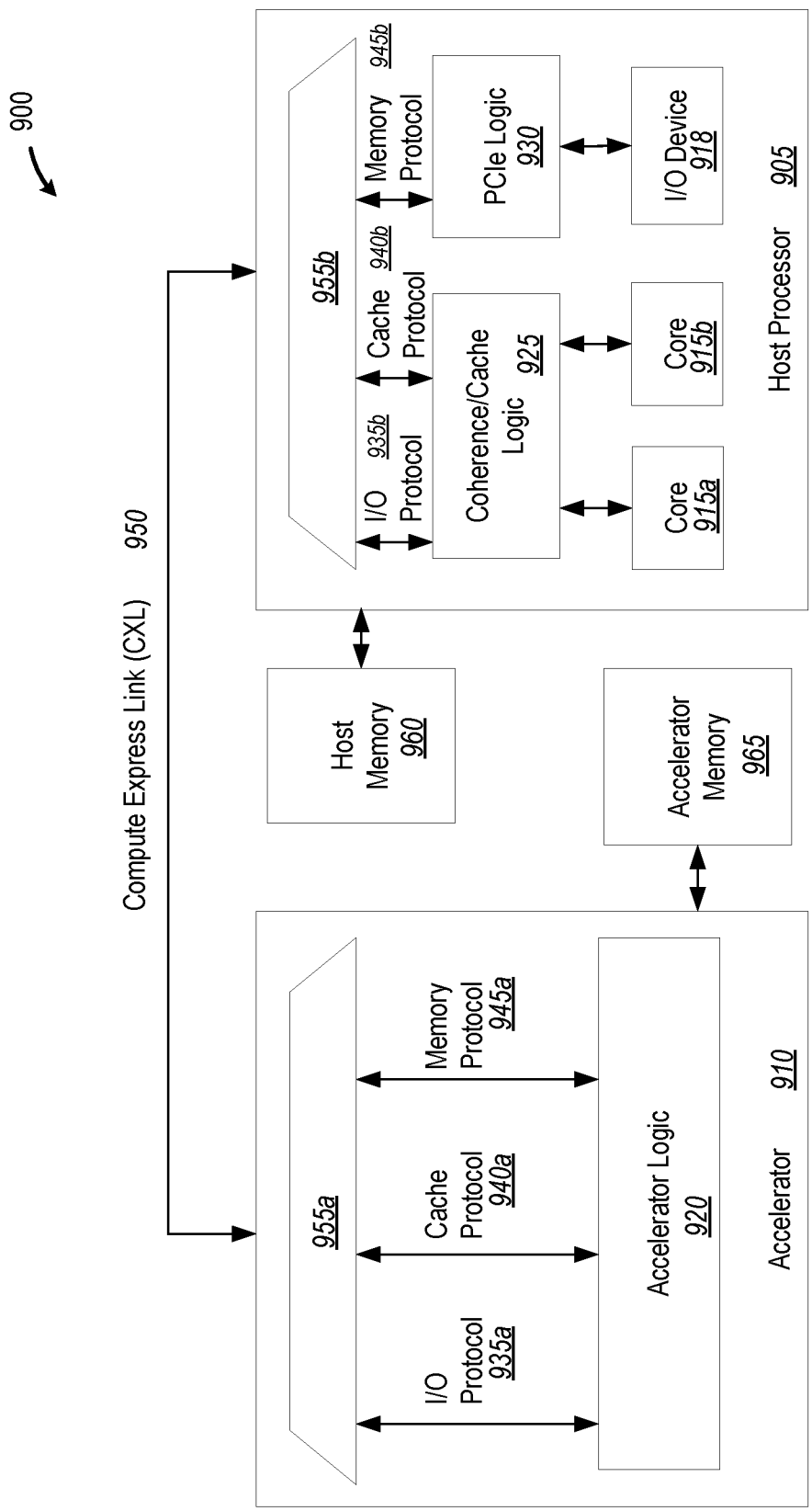
FIG. 9 illustrates a simplified block diagram is shown illustrating an example system utilizing a CXL link.

Turning to FIG. 9, a simplified block diagram 900 is shown illustrating an example system utilizing a CXL link 950. For instance, the link 950 may interconnect a host processor 905 (e.g., CPU) to an accelerator device 910. In this example, the host processor 905 includes one or more processor cores (e.g., 915a-b) and one or more I/O devices (e.g., 918). Host memory (e.g., 960) may be provided with the host processor (e.g., on the same package or die). The accelerator device 910 may include accelerator logic 920 and, in some implementations, may include its own memory (e.g., accelerator memory 965). In this example, the host processor 905 may include circuitry to implement coherence/cache logic 925 and interconnect logic (e.g., PCIe logic 930). CXL multiplexing logic (e.g., 955a-b) may also be provided to enable multiplexing of CXL protocols (e.g., I/O protocol 935a-b (e.g., CXL.io), caching protocol 940a-b (e.g., CXL.cache), and memory access protocol 945a-b (CXL.mem)), thereby enabling data of any one of the supported protocols (e.g., 935a-b, 940a-b, 945a-b) to be sent, in a multiplexed manner, over the link 950 between host processor 905 and accelerator device 910.

In some implementations, a Flex Bus™ port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 10:
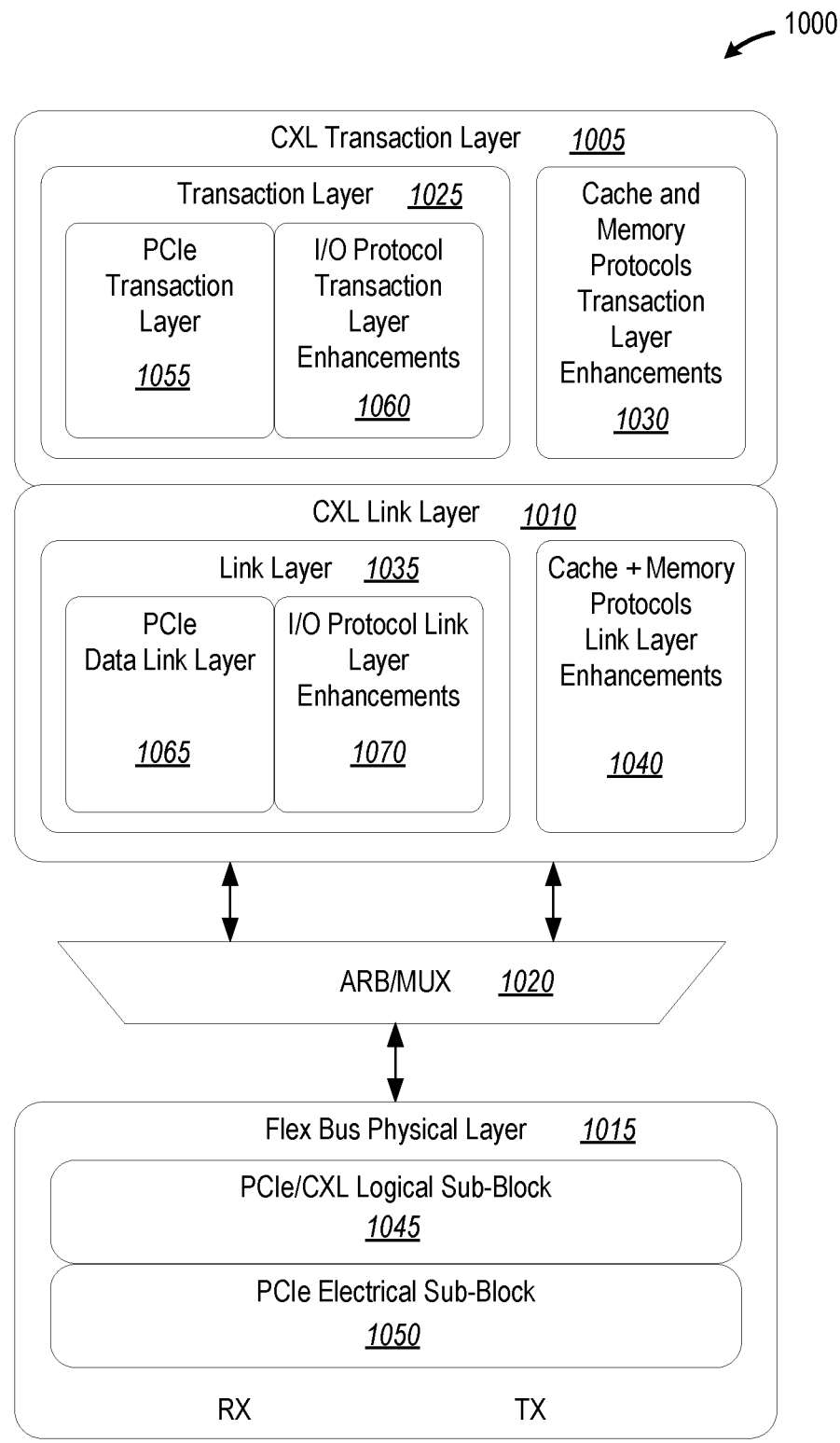
FIG. 10 illustrates a simplified block diagram illustrating an example port architecture utilized to implement CXL links.

FIG. 10 illustrates a simplified block diagram illustrating an example port architecture 1000 (e.g., Flex Bus) utilized to implement CXL links. For instance, Flex Bus architecture may be organized as multiple layers to implement the multiple protocols supported by the port. For instance, the port may include transaction layer logic (e.g., 1005), link layer logic (e.g., 1010), and physical layer logic (e.g., 1015) (e.g., implemented all or in-part in circuitry). For instance, a transaction (or protocol) layer (e.g., 1005) may be subdivided into transaction layer logic 1025 that implements a PCIe transaction layer 1055 and CXL transaction layer enhancements 1060 (for CXL.io) of a base PCIe transaction layer 1055, and logic 1030 to implement cache (e.g., CXL.cache) and memory (e.g., CXL.mem) protocols for a CXL link. Similarly, link layer logic 1035 may be provided to implement a base PCIe data link layer 1065 and a CXL link layer (for CXI.io) representing an enhanced version of the PCIe data link layer 1065. A CXL link layer 1010 may also include cache and memory link layer enhancement logic 1040 (e.g., for CXL.cache and CXL.mem).

Continuing with the example of FIG. 10, a CXL link layer logic 1010 may interface with CXL arbitration/multiplexing (ARB/MUX) logic 1020, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples.

In some implementations, the port (e.g., a Flex Bus port) may utilize a physical layer 1015 based on a PCIe physical layer (e.g., PCIe electrical PHY 1050). For instance, a Flex Bus physical layer may be implemented as a converged logical physical layer 1045 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., x16, x8, x4, x2, x1, etc.). In PCIe mode, links implemented by the port 1000 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

Figure 11:
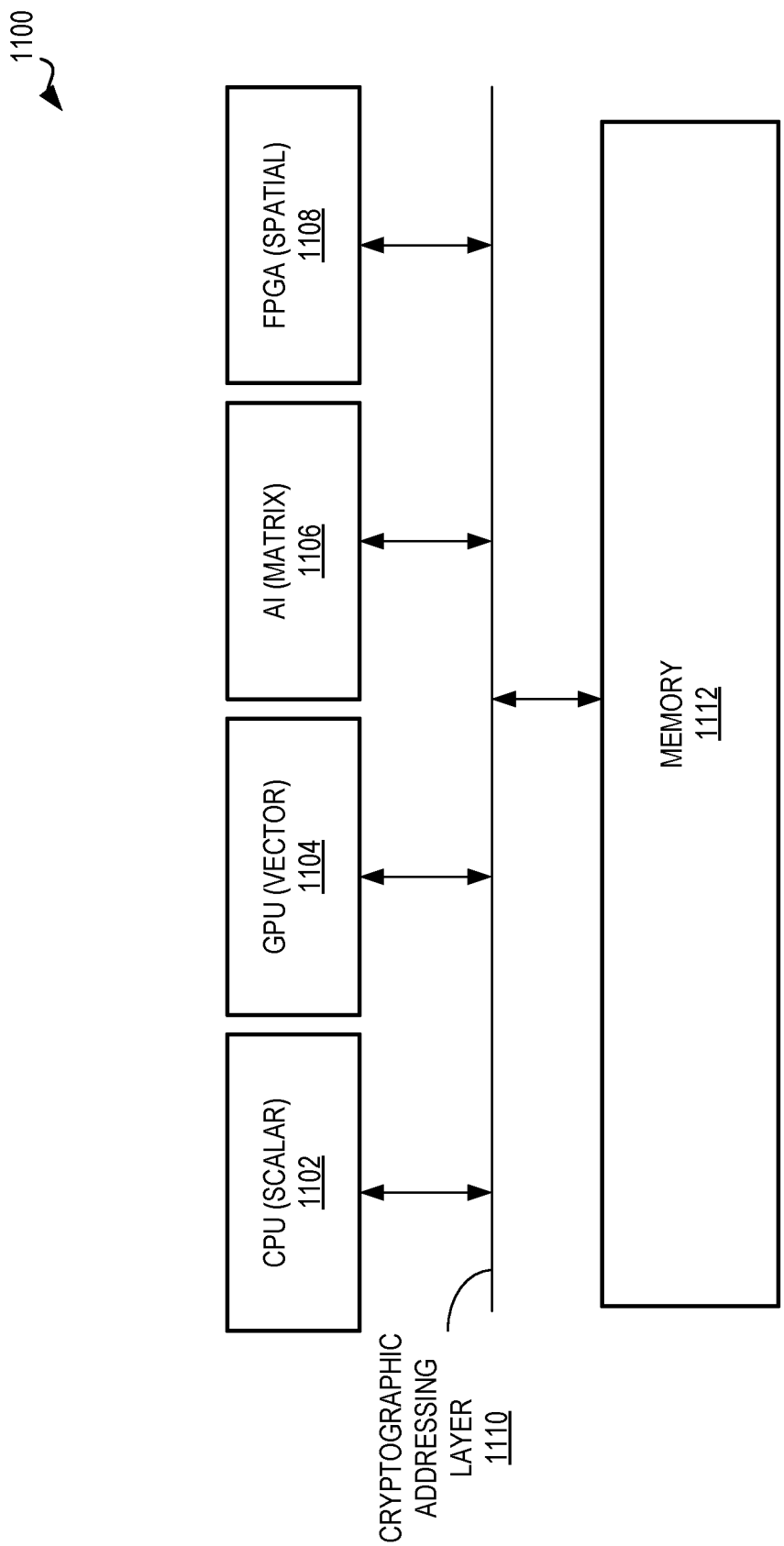
FIG. 11 is a block diagram illustrating an example cryptographic computing environment according to at least one embodiment.
Figure 12:
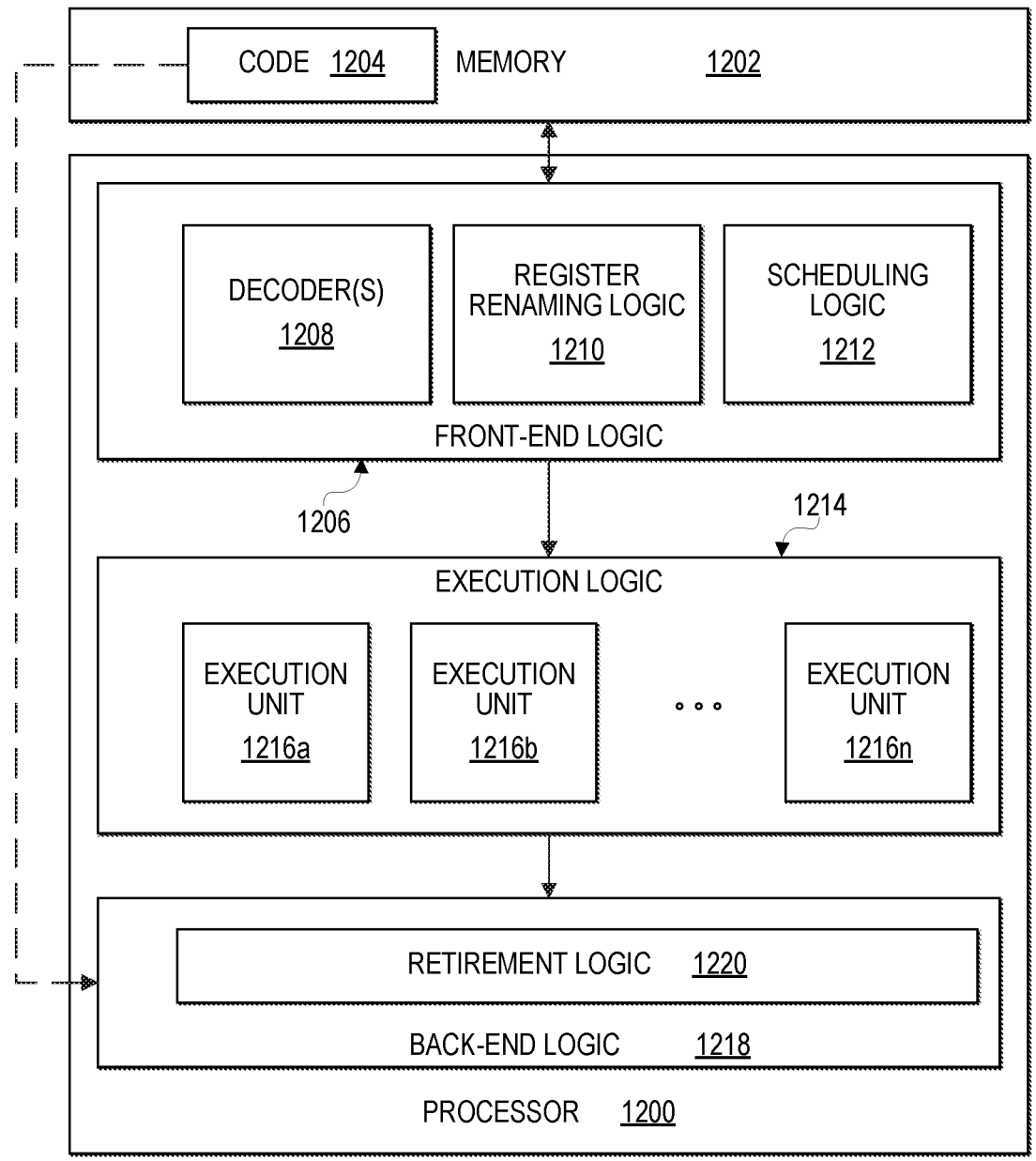
FIG. 12 is a block diagram illustrating an example processor according to at least one embodiment.

FIGS. 11-12 below provide some example computing devices, computing environments, hardware, software or flows that may be used in the context of embodiments as described herein.

FIG. 11 is a block diagram illustrating an example cryptographic computing environment 1100 according to at least one embodiment. In the example shown, a cryptographic addressing layer 1110 extends across the example compute vectors central processing unit (CPU) 1102, graphical processing unit (GPU) 1104, artificial intelligence (AI) 1106, and field programmable gate array (FPGA) 1108. For example, the CPU 1102 and GPU 1104 may share the same virtual address translation for data stored in memory 1112, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1112 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 13:
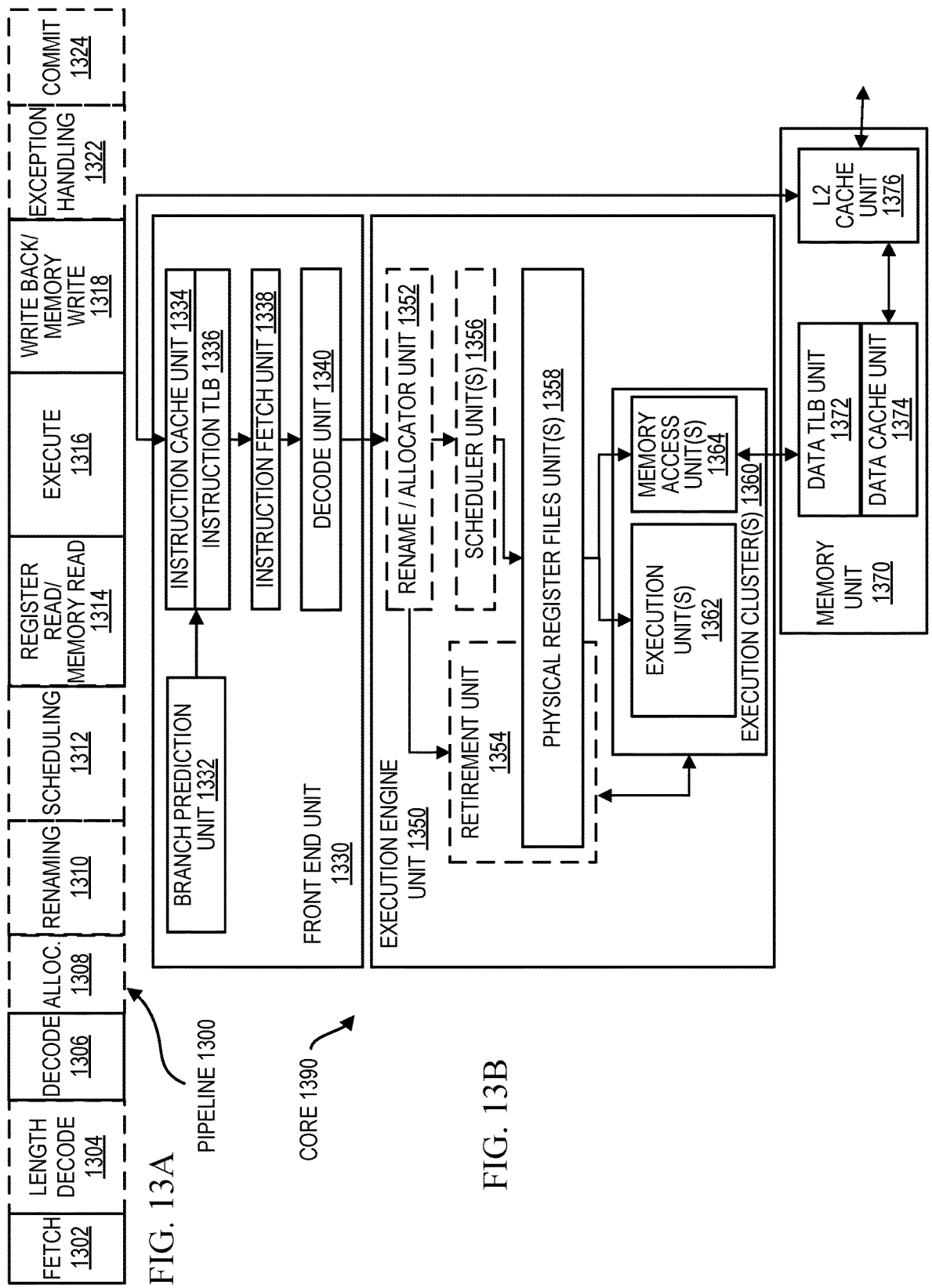
FIG. 13A is a block diagram illustrating both an exemplary in-order pipeline and an exemplary register renaming, out-of-order issue/execution pipeline in accordance with certain embodiments.
FIG. 13B is a block diagram illustrating both an exemplary embodiment of an in-order architecture core and an exemplary register renaming, out-of-order issue/execution architecture core to be included in a processor in accordance with certain embodiments.
Figure 14:
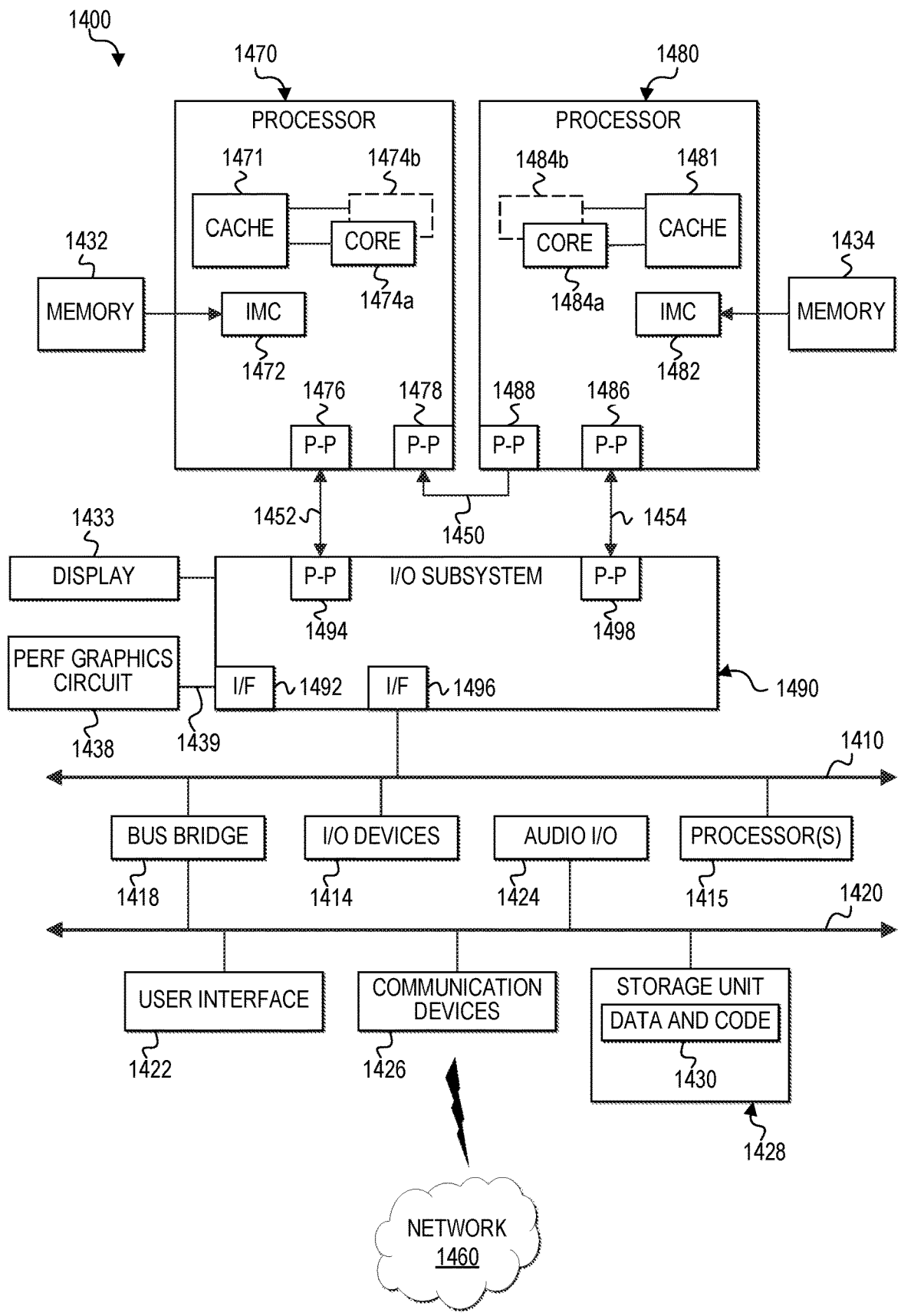
FIG. 14 is a block diagram of an example computer architecture according to at least one embodiment.

FIGS. 12-14 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 12-14.

FIG. 12 is an example illustration of a processor according to an embodiment. Processor 1200 is an example of a type of hardware device that can be used in connection with the implementations shown and described herein (e.g., processor 102). Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13A is a block diagram illustrating both an exemplary in-order pipeline and an exemplary register renaming, out-of-order issue/execution pipeline according to one or more embodiments of this disclosure. FIG. 13B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 13A-13B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. Processor core 1390 and memory unit 1370 are examples of the types of hardware that can be used in connection with the implementations shown and described herein (e.g., processor 102, memory 120). The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like. In addition, processor core 1390 and its components represent example architecture that could be used to implement logical processors and their respective components.

The front end unit 1330 includes a branch prediction unit 1332 coupled to an instruction cache unit 1334, which is coupled to an instruction translation lookaside buffer (TLB) unit 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers (GPRs). In at least some embodiments described herein, register units 1358 are examples of the types of hardware that can be used in connection with the implementations shown and described herein (e.g., registers 110). The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1362 may also include an address generation unit to calculate addresses used by the core to access main memory (e.g., memory unit 1370) and a page miss handler (PMH).

The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory. In addition, a page miss handler may also be included in core 1390 to look up an address mapping in a page table if no match is found in the data TLB unit 1372.

By way of example, the exemplary register renaming, out-of-order issue/execution core architecture may implement the pipeline 1300 as follows: 1) the instruction fetch unit 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the scheduling stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems or computing devices described herein may be configured in the same or similar manner as computing system 1400.

Processors 1470 and 1480 may be implemented as single core processors 1474a and 1484a or multi-core processors 1474a-1474b and 1484a-1484b. Processors 1470 and 1480 may each include a cache 1471 and 1481 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1400. Moreover, processors 1470 and 1480 are examples of the types of hardware that can be used in connection with the implementations shown and described herein (e.g., processor 102).

Processors 1470 and 1480 may also each include integrated memory controller logic (IMC) 1472 and 1482 to communicate with memory elements 1432 and 1434, which may be portions of main memory locally attached to the respective processors. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface 1450 using point-to-point interface circuits 1478 and 1488, respectively. Processors 1470 and 1480 may each exchange data with an input/output (I/O) subsystem 1490 via individual point-to-point interfaces 1452 and 1454 using point-to-point interface circuits 1476, 1486, 1494, and 1498. I/O subsystem 1490 may also exchange data with a high-performance graphics circuit 1438 via a high-performance graphics interface 1439, using an interface circuit 1492, which could be a PtP interface circuit. In one embodiment, the high-performance graphics circuit 1438 is a special-purpose processor, such as, for example, a high-throughput MIC processor, a network or communication processor, compression engine, graphics processor, GPGPU, embedded processor, or the like. I/O subsystem 1490 may also communicate with a display 1433 for displaying data that is viewable by a human user. In alternative embodiments, any or all of the PtP links illustrated in FIG. 14 could be implemented as a multi-drop bus rather than a PtP link.

I/O subsystem 1490 may be in communication with a bus 1410 via an interface circuit 1496. Bus 1410 may have one or more devices that communicate over it, such as a bus bridge 1418, I/O devices 1414, and one or more other processors 1415. Via a bus 1420, bus bridge 1418 may be in communication with other devices such as a user interface 1422 (such as a keyboard, mouse, touchscreen, or other input devices), communication devices 1426 (such as modems, network interface devices, or other types of communication devices that may communicate through a computer network 1460), audio I/O devices 1424, and/or a storage unit 1428. Storage unit 1428 may store data and code 1430, which may be executed by processors 1470 and/or 1480. In alternative embodiments, any portions of the bus architectures could be implemented with one or more PtP links.

Program code, such as code 1430, may be applied to input instructions to perform the functions described herein and generate output information. The output information may be applied to one or more output devices, in known fashion. For purposes of this application, a processing system may be part of computing system 1400 and includes any system that has a processor, such as, for example; a digital signal processor (DSP), a microcontroller, an application specific integrated circuit (ASIC), or a microprocessor.

The program code (e.g., 1430) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
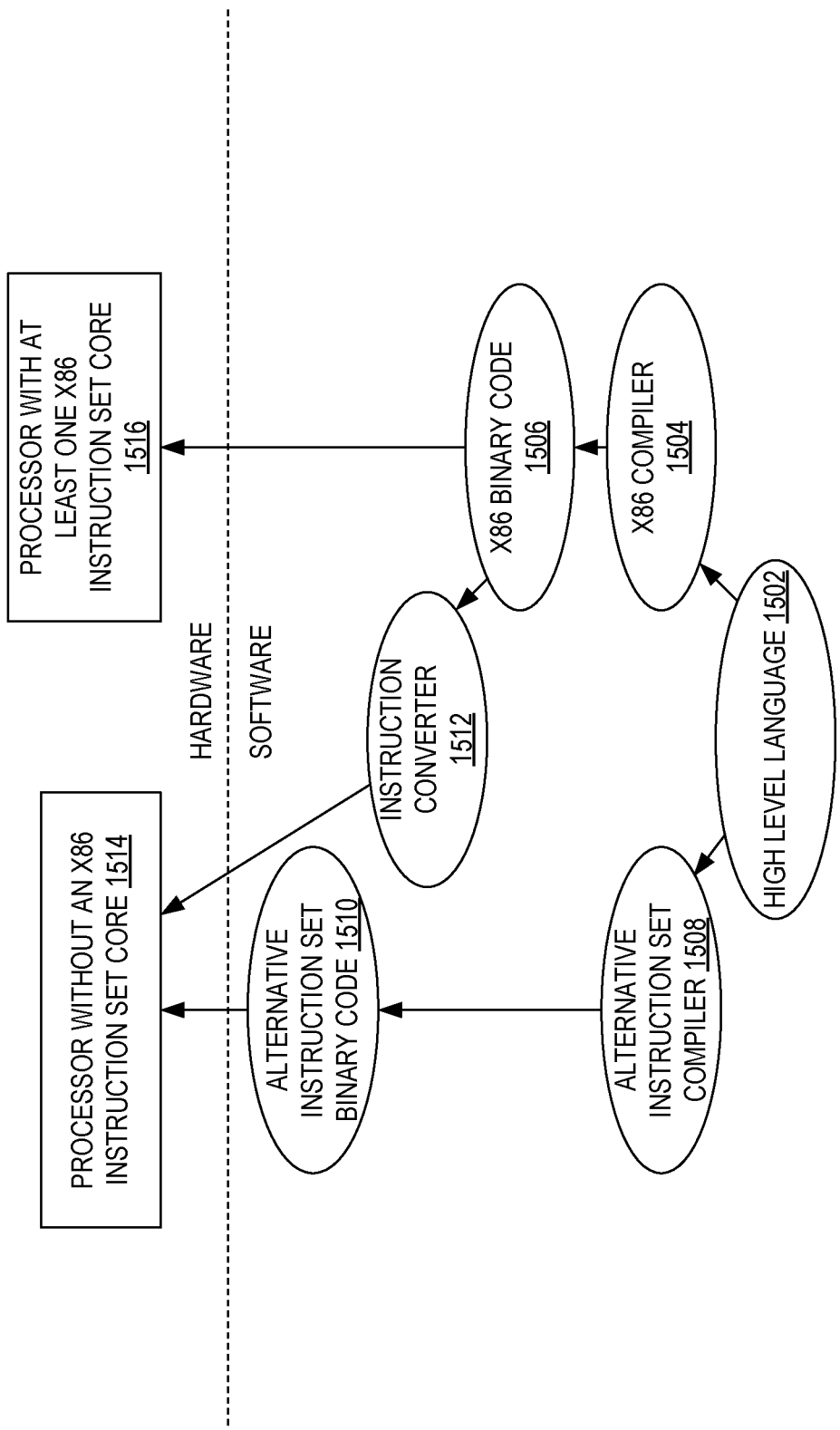
FIG. 15 is a block diagram contrasting the use of a software instruction converter to convert binary instructions in a source instruction set to binary instructions in a target instruction set according to embodiments of the present disclosure.

FIG. 15 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, CA and/or that execute the ARM instruction set of ARM Holdings of Sunnyvale, CA). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

One or more aspects of at least one embodiment may be implemented by representative instructions stored on a machine readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine readable media containing instructions or containing design data, such as Hardware Description Language (HDL), which defines structures, circuits, apparatuses, processors and/or system features described herein. Such embodiments may also be referred to as program products.

The computing system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLES

Example 1 includes an apparatus comprising: interconnect circuitry to interface between a peripheral device, a processor, and memory; and cryptographic computing circuitry to: obtain one or more keys based on a process identifier of a read request received by the interconnect circuitry from the peripheral device; decrypt an encrypted virtual address of the read request based on the one or more keys to obtain an unencrypted virtual address; cause the interconnect circuitry to retrieve encrypted from the memory based on the unencrypted virtual address; decrypt the encrypted data based on the one or more keys to obtain plaintext data; and cause the interconnect circuitry to transmit the plaintext data to the peripheral device.

Example 2 includes the subject matter of Example 1, wherein the one or more keys comprise a data key and a pointer key, the decryption of the encrypted virtual address is based on the pointer key and the decryption of the encrypted data is based on the data key.

Example 3 includes the subject matter of 1 or 2, wherein the cryptographic computing circuitry is to decrypt the encrypted data using the encrypted virtual address as a tweak input.

Example 4 includes the subject matter of any one of Examples 1-3, wherein the cryptographic computing circuitry is to obtain the one or more keys from a hierarchical table structure in the memory based on the bits of the process identifier.

Example 5 includes the subject matter of any one of Examples 1-4, wherein the interconnect circuitry comprises an input/output memory management unit (IOMMU) to retrieve the encrypted data from the memory and transmit the plaintext data to the peripheral device.

Example 6 includes the subject matter of Example 5, wherein the cryptographic computing circuitry is implemented within the IOMMU.

Example 7 includes the subject matter of Example 5, wherein the IOMMU is to obtain a physical address in the memory based on the unencrypted virtual address.

Example 8 includes the subject matter of any one of Examples 1-7, wherein the interconnect circuitry is to implement a Peripheral Component Interconnect Express (PCIe)-based interconnect, and the process identifier is a Process Address Space Identifier (PASID).

Example 9 includes the subject matter of Example 8, wherein the one or more keys are obtained from an entry of a PASID table.

Example 10 includes the subject matter of Example 8, wherein the one or more keys are obtained from the memory based on a pointer in an entry of a PASID table.

Example 11 includes the subject matter of any one of Examples 8-10, wherein the read request further comprises a Bus/Device/Function (BDF), and the one or more keys are obtained further based on the BDF.

Example 12 includes a method comprising: receiving, at a cryptographic computing agent a host device, a read request from a peripheral device across an interconnect, the read request comprising a process identifier and an encrypted virtual address; obtaining one or more keys based on the process identifier of the read request; decrypting the encrypted virtual address of the read request based on the one or more keys to obtain an unencrypted virtual address; retrieving encrypted data from a memory based on the unencrypted virtual address; decrypting the encrypted data based on the one or more keys to obtain plaintext data; and transmitting the plaintext data to the peripheral device across the interconnect.

Example 13 includes the subject matter of Example 12, wherein the one or more keys comprise a data key and a pointer key, the decryption of the encrypted virtual address is based on the pointer key and the decryption of the encrypted data is based on the data key.

Example 14 includes the subject matter of Example 12 or 13, wherein decrypting the encrypted data comprises using the encrypted virtual address as a tweak input.

Example 15 includes the subject matter of any one of Examples 12-14, wherein the keys are obtained from a hierarchical table structure in the memory based on the bits of the process identifier.

Example 16 includes the subject matter of any one of Examples 12-15, further comprising obtaining a physical address based on the unencrypted virtual address.

Example 17 includes the subject matter of any one of Examples 12-16, wherein the interconnect is a Peripheral Component Interconnect Express (PCIe)-based interconnect, and the process identifier is a Process Address Space Identifier (PASID).

Example 18 includes the subject matter of Example 17, wherein the one or more keys are obtained from an entry of a PASID table.

Example 19 includes the subject matter of Example 17, wherein the one or more keys are obtained from the memory based on a pointer in an entry of a PASID table.

Example 20 includes the subject matter of any one of Examples 17-19, wherein the read request further comprises a Bus/Device/Function (BDF), and the one or more keys are obtained further based on the BDF.

Example 21 includes one or more non-transitory computer-readable media comprising instructions to cause an electronic device, upon execution of the instructions by one or more processors of the electronic device, to: receive a read request from a peripheral device across an interconnect comprising a process identifier and an encrypted virtual address; obtain one or more keys based on the process identifier of the read request; decrypt the encrypted virtual address of the read request based on the one or more keys to obtain an unencrypted virtual address; retrieve encrypted data from a memory based on the unencrypted virtual address; decrypt the encrypted data based on the one or more keys to obtain plaintext data; and cause the plaintext data to be transmitted to the peripheral device across the interconnect.

Example 22 includes the subject matter of Example 21, wherein the one or more keys comprise a data key and a pointer key, the decryption of the encrypted virtual address is based on the pointer key and the decryption of the encrypted data is based on the data key.

Example 23 includes the subject matter of Example 21 or 22, wherein the instructions are to decrypt the encrypted data using the encrypted virtual address as a tweak input.

Example 24 includes the subject matter of any one of Examples 21-23, wherein the instructions are to obtain the one or more keys from a hierarchical table structure in the memory based on the bits of the process identifier.

Example 25 includes the subject matter of any one of Examples 21-24, wherein the instructions are further to obtain a physical address based on the unencrypted virtual address.

Example 26 includes the subject matter of any one of Examples 21-25, wherein the interconnect is a Peripheral Component Interconnect Express (PCIe)-based interconnect, and the process identifier is a Process Address Space Identifier (PASID).

Example 27 includes the subject matter of Example 26, wherein the one or more keys are obtained from an entry of a PASID table.

Example 28 includes the subject matter of Example 26, wherein the one or more keys are obtained from the memory based on a pointer in an entry of a PASID table.

Example 29 includes the subject matter of any one of Examples 26-28, wherein the read request further comprises a Bus/Device/Function (BDF), and the one or more keys are obtained further based on the BDF.

Example 30 includes an apparatus comprising: interconnect circuitry to interface between a peripheral device, a processor, and memory; and cryptographic computing circuitry to: obtain one or more keys based on a process identifier of a write request received by the interconnect circuitry from the peripheral device; decrypt an encrypted virtual address of the read request based on the one or more keys to obtain an unencrypted virtual address; encrypt data associated with the write request based on the one or more keys; and cause the interconnect circuitry to transmit the encrypted data to the memory for storage.

Example 31 includes the subject matter of Example 30, wherein the one or more keys comprise a data key and a pointer key, the decryption of the encrypted virtual address is based on the pointer key and the encryption of the data associated with the write request is based on the data key.

Example 32 includes the subject matter of Example 30 or 31, wherein the cryptographic computing circuitry is to encrypt the data associated with the write request using the encrypted virtual address as a tweak input.

Example 33 includes the subject matter of any one of Examples 30-32, wherein the cryptographic computing circuitry is to obtain the one or more keys from a hierarchical table structure in the memory based on the bits of the process identifier.

Example 34 includes the subject matter of any one of Examples 30-33, wherein the interconnect circuitry comprises an input/output memory management unit (IOMMU) to cause the interconnect circuitry to transmit the encrypted data to the memory for storage.

Example 35 includes the subject matter of Example 34, wherein the cryptographic computing circuitry is implemented within the IOMMU.

Example 36 includes the subject matter of Example 34, wherein the IOMMU is to obtain a physical address in the memory based on the unencrypted virtual address.

Example 37 includes the subject matter of any one of Examples 30-36, wherein the interconnect circuitry is to implement a Peripheral Component Interconnect Express (PCIe)-based interconnect, and the process identifier is a Process Address Space Identifier (PASID).

Example 38 includes the subject matter of Example 37, wherein the one or more keys are obtained from an entry of a PASID table.

Example 39 includes the subject matter of Example 37, wherein the one or more keys are obtained from the memory based on a pointer in an entry of a PASID table.

Example 40 includes the subject matter of any one of Examples 37-39, wherein the read request further comprises a Bus/Device/Function (BDF), and the one or more keys are obtained further based on the BDF.

Example 41 includes a method comprising: receiving, at a cryptographic computing agent a host device, a write request from a peripheral device across an interconnect, the write request comprising data to be written, a process identifier, and an encrypted virtual address; obtaining one or more keys based on the process identifier of the write request; decrypting the encrypted virtual address of the write request based on the one or more keys to obtain an unencrypted virtual address; encrypting the data to be written based on the one or more keys; and storing the encrypted data in memory.

Example 42 includes the subject matter of Example 41, wherein the one or more keys comprise a data key and a pointer key, the decryption of the encrypted virtual address is based on the pointer key and the encryption of the data to be written is based on the data key.

Example 43 includes the subject matter of Example 41 or 42, wherein encrypting the data to be written comprises using the encrypted virtual address as a tweak input.

Example 44 includes the subject matter of any one of Examples 41-43, wherein the keys are obtained from a hierarchical table structure in the memory based on the bits of the process identifier.

Example 45 includes the subject matter of any one of Examples 41-44, further comprising obtaining a physical address based on the unencrypted virtual address.

Example 46 includes the subject matter of any one of Examples 41-45, wherein the interconnect is a Peripheral Component Interconnect Express (PCIe)-based interconnect, and the process identifier is a Process Address Space Identifier (PASID).

Example 47 includes the subject matter of Example 46, wherein the one or more keys are obtained from an entry of a PASID table.

Example 48 includes the subject matter of Example 46, wherein the one or more keys are obtained from the memory based on a pointer in an entry of a PASID table.

Example 49 includes the subject matter of any one of Examples 46-48, wherein the read request further comprises a Bus/Device/Function (BDF), and the one or more keys are obtained further based on the BDF.

Example 50 includes one or more non-transitory computer-readable media comprising instructions to cause an electronic device, upon execution of the instructions by one or more processors of the electronic device, to: receive a write request from a peripheral device across an interconnect comprising data to be written to memory, a process identifier, and an encrypted virtual address; obtain one or more keys based on the process identifier of the write request; decrypt the encrypted virtual address of the write request based on the one or more keys to obtain an unencrypted virtual address; encrypt the data to be written based on the one or more keys; and cause the encrypted data to be transmitted to the memory for storage.

Example 51 includes the subject matter of Example 50, wherein the one or more keys comprise a data key and a pointer key, the decryption of the encrypted virtual address is based on the pointer key and the encryption of the data to be written is based on the data key.

Example 52 includes the subject matter of Example 50 or 51, wherein the instructions are to encrypt the data to be written using the encrypted virtual address as a tweak input.

Example 53 includes the subject matter of any one of Examples 50-52, wherein the instructions are to obtain the one or more keys from a hierarchical table structure in the memory based on the bits of the process identifier.

Example 54 includes the subject matter of any one of Examples 50-53, further comprising obtaining a physical address based on the unencrypted virtual address.

Example 55 includes the subject matter of any one of Examples 50-54, wherein the interconnect is a Peripheral Component Interconnect Express (PCIe)-based interconnect, and the process identifier is a Process Address Space Identifier (PASID).

Example 56 includes the subject matter of Example 55, wherein the instructions are to obtain the one or more keys from an entry of a PASID table.

Example 57 includes the subject matter of Example 55, wherein the instructions are to obtain the one or more keys from the memory based on a pointer in an entry of a PASID table.

Example 58 includes the subject matter of any one of Examples 55-57, wherein the read request further comprises a Bus/Device/Function (BDF), and the one or more keys are obtained further based on the BDF.

Example 59 includes a system comprising: a processor; memory; interconnect circuitry to interconnect the processor and memory with a peripheral device, the interconnect circuitry to receive requests from the peripheral device to read or write to the memory; and cryptographic computing circuitry to: obtain one or more keys based on a process identifier of the requests; decrypt an encrypted virtual address of the request based on the one or more keys to obtain an unencrypted virtual address; and for requests to read data from the memory: retrieve encrypted data from a memory based on the unencrypted virtual address; decrypt the encrypted data based on the one or more keys to obtain plaintext data; and cause the plaintext data to be transmitted to the peripheral device; and for requests to write data to the memory: encrypt data associated with the write request based on the one or more keys; and cause the encrypted data to be stored in the memory.

Example 60 includes the subject matter of Example 59, wherein the one or more keys comprise a data key and a pointer key, the decryption of the encrypted virtual address is based on the pointer key and the encryption or decryption of data is based on the data key.

Example 61 includes the subject matter of Example 59 or 60, wherein the circuitry is further to: for requests to read data from the memory, decrypt the encrypted data using the encrypted virtual address as a tweak input; and for requests to write data to the memory, encrypt the data using the encrypted virtual address as a tweak input.

Example 62 includes the subject matter of any one of Examples 59-61, wherein the cryptographic computing circuitry is to obtain the one or more keys from a hierarchical table structure in the memory based on the bits of the process identifier.

Example 63 includes the subject matter of any one of Examples 59-62, wherein the interconnect circuitry comprises an input/output memory management unit (IOMMU) to retrieve the encrypted data associated with read requests from the memory and transmit the encrypted data associated with write requests for storage in the memory.

Example 64 includes the subject matter of Example 63, wherein the cryptographic computing circuitry is implemented within the IOMMU.

Example 65 includes the subject matter of Example 63, wherein the IOMMU is to obtain a physical address in the memory based on the unencrypted virtual address.

Example 66 includes the subject matter of any one of Examples 59-65, wherein the interconnect circuitry is to implement a Peripheral Component Interconnect Express (PCIe)-based interconnect, and the process identifier is a Process Address Space Identifier (PASID).

Example 67 includes the subject matter of Example 66, wherein the one or more keys are obtained from an entry of a PASID table.

Example 68 includes the subject matter of Example 66, wherein the one or more keys are obtained from the memory based on a pointer in an entry of a PASID table.

Example 69 includes the subject matter of any one of Examples 66-68, wherein the read request further comprises a Bus/Device/Function (BDF), and the one or more keys are obtained further based on the BDF.

The invention claimed is:

1. An apparatus comprising:
   interconnect circuitry to interface between a peripheral device, a processor, and memory; and
   cryptographic computing circuitry to:
      obtain one or more keys based on a process identifier of a read request received by the interconnect circuitry from the peripheral device;
      decrypt an encrypted virtual address of the read request based on the one or more keys to obtain an unencrypted virtual address;
      cause the interconnect circuitry to retrieve encrypted data from the memory based on the unencrypted virtual address;
      decrypt the encrypted data based on the one or more keys to obtain plaintext data; and
      cause the interconnect circuitry to transmit the plaintext data to the peripheral device.

2. The apparatus of claim 1, wherein the one or more keys comprise a data key and a pointer key, the decryption of the encrypted virtual address is based on the pointer key and the decryption of the encrypted data is based on the data key.

3. The apparatus of claim 1, wherein the cryptographic computing circuitry is to decrypt the encrypted data using the encrypted virtual address as a tweak input.

4. The apparatus of claim 1, wherein the cryptographic computing circuitry is to obtain the one or more keys from a hierarchical table structure in the memory based on the bits of the process identifier.

5. The apparatus of claim 1, wherein the interconnect circuitry comprises an input/output memory management unit (IOMMU) to retrieve the encrypted data from the memory and transmit the plaintext data to the memory.

6. The apparatus of claim 5, wherein the cryptographic computing circuitry is implemented within the IOMMU.

7. The apparatus of claim 5, wherein the IOMMU is to obtain a physical address in the memory based on the unencrypted virtual address.

8. The apparatus of claim 1, wherein the interconnect circuitry is to implement a Peripheral Component Interconnect Express (PCIe)-based interconnect, and the process identifier is a Process Address Space Identifier (PASID).

9. The apparatus of claim 8, wherein the one or more keys are obtained from an entry of a PASID table.

10. The apparatus of claim 8, wherein the one or more keys are obtained from the memory based on a pointer in an entry of a PASID table.

11. The apparatus of claim 8, wherein the read request further comprises a Bus/Device/Function (BDF), and the one or more keys are obtained further based on the BDF.

12. One or more non-transitory computer-readable media comprising instructions to cause an electronic device, upon execution of the instructions by one or more processors of the electronic device, to:
   receive a read request from a peripheral device across an interconnect comprising a process identifier and an encrypted virtual address;
   obtain one or more keys based on the process identifier of the read request;
   decrypt the encrypted virtual address of the read request based on the one or more keys to obtain an unencrypted virtual address;
   retrieve encrypted data from a memory based on the unencrypted virtual address;
   decrypt the encrypted data based on the one or more keys to obtain plaintext data; and
   cause the plaintext data to be transmitted to the peripheral device across the interconnect.

13. The computer-readable media of claim 12, wherein the one or more keys comprise a data key and a pointer key, the decryption of the encrypted virtual address is based on the pointer key and the decryption of the encrypted data is based on the data key.

14. The computer-readable media of claim 12, wherein the instructions are to decrypt the encrypted data using the encrypted virtual address as a tweak input.

15. The computer-readable media of claim 12, wherein the instructions are to obtain the one or more keys from a hierarchical table structure in the memory based on the bits of the process identifier.

16. The computer-readable media of claim 12, wherein the interconnect is a Peripheral Component Interconnect Express (PCIe)-based interconnect, and the process identifier is a Process Address Space Identifier (PASID).

17. The computer-readable media of claim 16, wherein the one or more keys are obtained from an entry of a PASID table.

18. The computer-readable media of claim 16, wherein the one or more keys are obtained from the memory based on a pointer in an entry of a PASID table.

19. The computer-readable media of claim 16, wherein the read request further comprises a Bus/Device/Function (BDF), and the one or more keys are obtained further based on BDF.

20. A system comprising:
   a processor;
   memory;
   interconnect circuitry to interconnect the processor and memory with a peripheral device, the interconnect circuitry to receive requests from the peripheral device to read or write to the memory; and
   cryptographic computing circuitry to:
      obtain one or more keys based on a process identifier of the requests;
      decrypt an encrypted virtual address of the request based on the one or more keys to obtain an unencrypted virtual address; and
      for requests to read data from the memory:
         retrieve encrypted data from a memory based on the unencrypted virtual address;
         decrypt the encrypted data based on the one or more keys to obtain plaintext data; and
         cause the plaintext data to be transmitted to the peripheral device; and for requests to write data to the memory:
   encrypt data associated with the write request based on the one or more keys; and
   cause the encrypted data to be stored in the memory.

21. The system of claim 20, wherein the one or more keys comprise a data key and a pointer key, the decryption of the encrypted virtual address is based on the pointer key and the encryption or decryption of data is based on the data key.

22. The system of claim 20, wherein the circuitry is further to:
   for requests to read data from the memory, decrypt the encrypted data using the encrypted virtual address as a tweak input; and
   for requests to write data to the memory, encrypt the data using the encrypted virtual address as a tweak input.

23. The system of claim 20, wherein the cryptographic computing circuitry is to obtain the one or more keys from a hierarchical table structure in the memory based on the bits of the process identifier.

24. The system of claim 20, wherein the interconnect circuitry is to implement a Peripheral Component Interconnect Express (PCIe)-based interconnect, and the process identifier is a Process Address Space Identifier (PASID).

25. The system of claim 24, wherein the one or more keys are obtained from an entry of a PASID table or from the memory based on a pointer in an entry of a PASID table.

\* \* \* \* \*